(12) United States Patent
Takatsukasa

(10) Patent No.: US 10,601,584 B2
(45) Date of Patent: Mar. 24, 2020

(54) INFORMATION PROCESSING APPARATUS, INFORMATION PROCESSING SYSTEM AND MEDIUM

(71) Applicant: FUJI ELECTRIC CO., LTD., Kanagawa (JP)

(72) Inventor: Kenji Takatsukasa, Tokyo (JP)

(73) Assignee: FUJI ELECTRIC CO., LTD., Kawasaki-shi, Kanagawa (JP)

(*) Notice: Subject to any disclaimer, the term of this patent is extended or adjusted under 35 U.S.C. 154(b) by 277 days.

(21) Appl. No.: 15/899,874

(22) Filed: Feb. 20, 2018

(65) Prior Publication Data

US 2018/0294954 A1   Oct. 11, 2018

(30) Foreign Application Priority Data

Apr. 5, 2017  (JP) .................................. 2017-075041

(51) Int. Cl.
*G06F 21/00* (2013.01)
*H04L 9/06* (2006.01)
*G06F 21/60* (2013.01)
*H04L 9/08* (2006.01)

(52) U.S. Cl.
CPC .......... *H04L 9/0631* (2013.01); *G06F 21/602* (2013.01); *H04L 9/0894* (2013.01); *H04L 2209/04* (2013.01); *H04L 2209/16* (2013.01)

(58) Field of Classification Search
CPC .... H04L 9/0631; H04L 9/0894; G06F 21/602
USPC ....................................................... 380/28
See application file for complete search history.

(56) References Cited

U.S. PATENT DOCUMENTS

| 8,817,973 B2* | 8/2014 | Itoh ........................ G06F 7/723 380/28 |
| 8,953,784 B2* | 2/2015 | Gong .................... H04L 9/0662 380/28 |
| 10,326,586 B2* | 6/2019 | Yu ......................... G06F 21/602 |
| 2006/0184765 A1* | 8/2006 | Krueger .................... G06F 7/76 712/4 |
| 2017/0353300 A1 | 12/2017 | Takatsukasa |

FOREIGN PATENT DOCUMENTS

| JP | 2013-205592 | 10/2013 |
| JP | 2017-215518 | 12/2017 |

* cited by examiner

*Primary Examiner* — Longbit Chai
(74) *Attorney, Agent, or Firm* — IPUSA, PLLC

(57) ABSTRACT

An information processing apparatus that processes a plurality of encrypted text data items includes: an input unit for inputting first data and second data that are the encrypted text data items; a first transforming unit for transforming the first data to first transformed data based on a first table; a second transforming unit for transforming the second data to second transformed data based on a second table; an addition unit for calculating an addition result by adding the first transformed data and the second transformed data; a remainder calculation unit for obtaining a remainder by dividing the addition result by an exponential number having 2 as a base and having the number of bits of the encrypted text data items as an exponent; and a third transforming unit for outputting an output result by transforming the remainder based on a third table.

10 Claims, 37 Drawing Sheets

$$Enc(DP1) + Enc(DP2) = T3[(T1[DC1] + T2[DC2]) \bmod N]$$

$$T1[x] = Dec(x) \times C1 + C2$$
$$T2[x] = Dec(x) \times C1 + C3$$
$$T3[x] = Enc((x - C2 - C3)/C1)$$

$$C1 \in \{2i+1 : 1, 3, \cdots, N-1\}, C2, C3 \in \{i : 0, \cdots, N-1\} \quad \cdots \quad (1)$$

FIG.4

$$Enc(DP1) + Enc(DP2) = T3[(T1[DC1] + T2[DC2]) \bmod N]$$

$$T1[x] = Dec(x) \times C1 + C2$$
$$T2[x] = Dec(x) \times C1 + C3$$
$$T3[x] = Enc((x - C2 - C3)/C1)$$

$$C1 \in \{2i+1:1,3,\cdots,N-1\}, C2, C3 \in \{i:0,\cdots,N-1\} \quad \cdots \quad (1)$$

FIG.6

$Enc(DP1) + Enc(DP2)$
$= T3[(T1[DC1] + T2[DC2]) \mod N]$
$= Enc((\{Dec(DC1) \times C1 + C2\} + \{Dec(DC2) \times C1 + C3\} - C2 - C3)/C1)$
$= Enc((\{DP1 \times C1 + C2\} + \{Dp2 \times C1 + C3\} - C2 - C3)/C1)$
$= Enc(DP1 + DP2)$   ・・・ (2)

FIG.7

(A) WHEN GREATEST COMMON FACTOR OF
M AND N IS 1 AND WHEN $j = M \times i \mod N$
$\rightarrow i$ AND $j$ HAVE 1 . 1 (ONE TO ONE) RELATIONSHIP (B) WHEN $N = 2^n$, M IS ALWAYS AN ODD NUMBER
AND SATISFIES (A).

$i, j \in \{0, \cdots, N-1\}$ ・・・(3)

FIG.9

$$Enc(DP1) - Enc(DP2) = T3[(T1[DC1] + T2[DC2]) \bmod N]$$

$$T1[x] = Dec(x) \times C1 + C2$$
$$T2[x] = -Dec(x) \times C1 + C3$$
$$T3[x] = Enc((x - C2 - C3)/C1)$$

$$C1 \in \{2i+1:1,3,\cdots,N-1\}, C2, C3 \in \{i:0,\cdots,N-1\} \quad \cdots \quad (4)$$

FIG.11

$Enc(DP1) - Enc(DP2)$
$= T3[(T1[DC1] + T2[DC2]) \bmod N]$
$= Enc((\{Dec(DC1) \times C1 + C2\} + \{-Dec(DC2) \times C1 + C3\} - C2 - C3)/C1)$
$= Enc((\{DP1 \times C1 + C2\} + \{-Dp2 \times C1 + C3\} - C2 - C3)/C1)$
$= Enc(DP1 - DP2) \quad \cdots \quad (5)$

FIG.14

$$Enc(DP3) \times Enc(DP4) = T6[(T4[DC3] \times T5[DC4]) \bmod N]$$

$$T4[x] = Dec(x) \times C4$$
$$T5[x] = Dec(x) \times C5$$
$$T6[x] = Enc(x \div C4 \div C5)$$

$$C4, C5 \in \{2i+1 : 1, 3, \cdots, N-1\} \quad \cdot \cdot \cdot \quad (6)$$

FIG.16

$Enc(DP3) \times Enc(DP4)$
$= T6[(T4[DC3] \times T5[DC4]) \bmod N]$
$= Enc(\{Dec(DC3) \times C4 \times Dec(DC4) \times C5\} \div C4 \div C5)$
$= Enc(\{DP3 \times C4 \times DP4 \times C5\} \div C4 \div C5)$
$= Enc(DP3 \times DP4) \quad \cdots \quad (7)$

FIG.18

$$Enc(DP3) \div Enc(DP4) = T6[(T4[DC3] \times T5[DC4]) \bmod N]$$

$$T4[x] = Dec(x) \times C4$$
$$T5[x] = 1 \div Dec(x) \times C5$$
$$T6[x] = Enc(x \div C4 \div C5)$$

$$C4, C5 \in \{2i+1 : 1, 3, \cdots, N-1\} \quad \cdots \quad (8)$$

FIG.20

$Enc(DP3) \div Enc(DP4)$
$= T6[(T4[DC3] \times T5[DC4]) \bmod N]$
$= Enc(\{Dec(DC3) \times C4 \div Dec(DC4) \times C5\} \div C4 \div C5)$
$= Enc(\{DP3 \times C4 \div DP4 \times C5\} \div C4 \div C5)$
$= Enc(DP3 \div DP4)$  · · · (9)

FIG.23

$$Enc(DP5) \& Enc(DP6) = T8[(T7[DC5] \& T7[DC6])]$$

$$T7[x] = Sort(NM, Dec(x))$$
$$T8[x] = Enc(InvSort(NM, Dec(x)))$$

$$NM \in \{i : 0, \cdots, n!-1\} \quad \cdot \cdot \cdot \quad (1\ 0)$$

FIG.25

$Enc(DP5) \& Enc(DP6)$
$= T8[T7[DC5] \& T7[DC6]]$
$= Enc(InvSort(NM, \{Sort(NM, Dec(DC5)) \& Sort(NM, Dec(DC6))\}))$
$= Enc(InvSort(NM, \{Sort(NM, DP5) \& Sort(NM, DP6)\}))$
$= Enc(InvSort(NM, Sort(NM, DP5 \& DP6)))$
$= Enc(DP5 \& DP6)$ ··· (11)

FIG.27

$$Enc(DP5) | Enc(DP6) = T8[(T7[DC5] | T7[DC6])]$$

$$T7[x] = Sort(NM, Dec(x))$$
$$T8[x] = Enc(InvSort(NM, Dec(x)))$$

$$NM \in \{i : 0, \cdots, n!-1\} \quad \cdot \cdot \cdot \quad (1\ 2)$$

FIG.29

$Enc(DP5) | Enc(DP6)$
$= T8[T7[DC5] | T7[DC6]]$
$= Enc(InvSort(NM, \{Sort(NM, Dec(DC5)) | Sort(NM, Dec(DC6))\}))$
$= Enc(InvSort(NM, \{Sort(NM, DP5) | Sort(NM, DP6)\}))$
$= Enc(InvSort(NM, Sort(NM, DP5 | DP6)))$
$= Enc(DP5 | DP6) \cdots (13)$

FIG.32

$$Enc(DP7) \wedge Enc(DP8) = T11[T9[DC7] \wedge T10[DC8]]$$

$T9[x] = Sort(NM, Dec(x) \wedge C6)$
$T10[x] = Sort(NM, Dec(x) \wedge C7)$
$T11[x] = Enc(InvSort(NM, x) \wedge C6 \wedge C7)$ $NM \in \{i : 0, \cdots, n!-1\}, C6, C7 \in \{i : 0, \cdots, N-1\} \cdot \cdot \cdot \quad (14)$

FIG.34

$Enc(DP7) \wedge Enc(DP8)$ $= T11[T9[DC7] \wedge T10[DC8]]$ $= Enc(InvSort(NM, \{Sort(NM, Dec(DC7) \wedge C6) \wedge Sort(NM, Dec(DC8) \wedge C7)\}) \wedge C6 \wedge C7)$ $= Enc(InvSort(NM, \{Sort(NM, DP7 \wedge C6) \wedge Sort(NM, DP8 \wedge C7)\}) \wedge C6 \wedge C7)$ $= Enc(InvSort(NM, Sort(NM, DP7 \wedge C6 \wedge DP8 \wedge C7)) \wedge C6 \wedge C7)$ $= Enc(DP7 \wedge C6 \wedge DP8 \wedge C7 \wedge C6 \wedge C7)$ $= Enc(DP7 \wedge DP8) \cdot \cdot \cdot (15)$

FIG.37

| BIT LENGTH OF DATA | AMOUNT OF DATA |
|---|---|
| n | $2^n \times n \div 8$ byte |
| 8 | 256 byte |
| 16 | 128 KB |
| 24 | 48 MB |
| 32 | 16 GB |

FIG.38

| TYPE OF PROCESS | TABLE | DEGREE OF DIFFICULTY OF DECRYPTION |
|---|---|---|
| MULTIPLICATION | T1 | $2^{2n-1}$ |
| MULTIPLICATION | T2 | $2^{2n-1}$ |
| MULTIPLICATION | T3 | $2^{3n-1}$ |
| SUBTRACTION | T1 | $2^{2n-1}$ |
| SUBTRACTION | T2 | $2^{2n-1}$ |
| SUBTRACTION | T3 | $2^{3n-1}$ |
| MULTIPLICATION | T4 | $2^{n-1}$ |
| MULTIPLICATION | T5 | $2^{n-1}$ |
| MULTIPLICATION | T6 | $2^{2n-2}$ |
| DIVISION | T4 | $2^{n-1}$ |
| DIVISION | T5 | $2^{n-1}$ |
| DIVISION | T6 | $2^{2n-2}$ |
| LOGICAL AND | T7 | $n!$ |
| LOGICAL AND | T8 | $n!$ |
| LOGICAL OR | T7 | $n!$ |
| LOGICAL OR | T8 | $n!$ |
| EXCLUSIVE OR | T9 | $n! \times 2^{2n}$ |
| EXCLUSIVE OR | T10 | $n! \times 2^{n}$ |
| EXCLUSIVE OR | T11 | $n! \times 2^{n}$ |

INFORMATION PROCESSING APPARATUS, INFORMATION PROCESSING SYSTEM AND MEDIUM

BACKGROUND OF THE INVENTION

1. Field of the Invention

The present invention relates to an information processing apparatus, an information processing system, and a medium.

2. Description of the Related Art

Conventionally, a method is known for protecting data leaks by encrypting the data and making it difficult to be decrypted.

For example, in case of applying an aggregation process to a plurality of data items, the data items are encrypted by a system based on a random number, the encrypted data items are generated, and the aggregation process is applied to the data items in an encrypted state. As described above, a method is known in which security is improved by a system by applying an aggregation process to the data items in an encrypted state and by causing the aggregation result to be also in an encrypted state (refer to, for example, Patent Document 1).

CITATION LIST

[Patent Document]
[Patent Document 1] Japanese Unexamined Patent Application Publication No. 2013-205592

SUMMARY OF THE INVENTION

Technical Problem

However, in the conventional method, the data may be encrypted in a proprietary manner, or may be encrypted according to a homomorphic encryption. As a result, in the conventional method, there is a case in which, even if the data is encrypted, the security level is lower than that in a state where the data is encrypted based on an algorithm such as AES (Advanced Encryption Standard), or the like. Specifically, in the conventional method, in many cases, a key used for encryption may be identified, or, algorithms for encryption and decryption may be revealed. Therefore, in the conventional method, there is a case in which the degree of difficulty of data decryption is low.

In view of the above-described problem, an object of an aspect of the present invention is to increase degree of difficulty of data decryption.

Solution to Problem

In order to solve the above-described problem, according to an embodiment of the present invention, an information processing apparatus that processes a plurality of encrypted data items is provided. The information processing apparatus includes: an input unit configured to input first data and second data that are the encrypted text data items; a first memory unit configured to store a first table used for transforming the first data and a second table used for transforming the second data; a first transforming unit configured to transform the first data to first transformed data based on the first table; a second transforming unit configured to transform the second data to second transformed data based on the second table; an addition unit configured to calculate an addition result by adding the first transformed data and the second transformed data; a remainder calculation unit configured to obtain a remainder by dividing the addition result by an exponential number having 2 as a base and having the number of bits of the encrypted text data; a second memory unit configured to store a third table used for transforming the remainder; and a third transforming unit configured to output an output result by transforming the remainder based on the third table.

Advantageous Effects of Invention

According to an embodiment of the present invention, it is possible to increase difficulty of data decryption.

BRIEF DESCRIPTION OF THE DRAWINGS

FIG. 4 is a formula illustrating calculation equivalent to an addition process by the information processing apparatus.

FIG. 6 is a formula for proving the equivalence of the addition process by the information processing apparatus.

FIG. 7 is a formula illustrating a theorem according to an embodiment of the present invention.

FIG. 9 is a formula illustrating calculation equivalent to a subtraction process by the information processing apparatus.

FIG. 11 is a formula for proving the equivalence of the subtraction process by the information processing apparatus.

FIG. 14 is a formula illustrating calculation equivalent to a multiplication process by the information processing apparatus.

FIG. 16 is a formula for proving the equivalence of the multiplication process by the information processing apparatus.

FIG. 18 is a formula illustrating calculation equivalent to a division process by the information processing apparatus.

FIG. 20 is a formula for proving the equivalence of the division process by the information processing apparatus.

FIG. 23 is a formula illustrating calculation equivalent to a logical AND process by the information processing apparatus.

FIG. 25 is a formula for proving the equivalence of the logical AND process by the information processing apparatus.

FIG. 27 is a formula illustrating calculation equivalent to a logical OR process by the information processing apparatus.

FIG. 29 is a formula for proving the equivalence of the logical OR process by the information processing apparatus.

FIG. 32 is a formula illustrating calculation equivalent to an exclusive OR process by the information processing apparatus.

FIG. 34 is a formula for proving the equivalence of the exclusive OR process by the information processing apparatus.

FIG. 37 is a table illustrating table size examples according to an embodiment of the present invention.

FIG. 38 is a table illustrating a degree of difficulty of decryption for each process type according to an embodiment of the present invention.

DETAILED DESCRIPTION OF THE PREFERRED EMBODIMENTS

Figure 1:
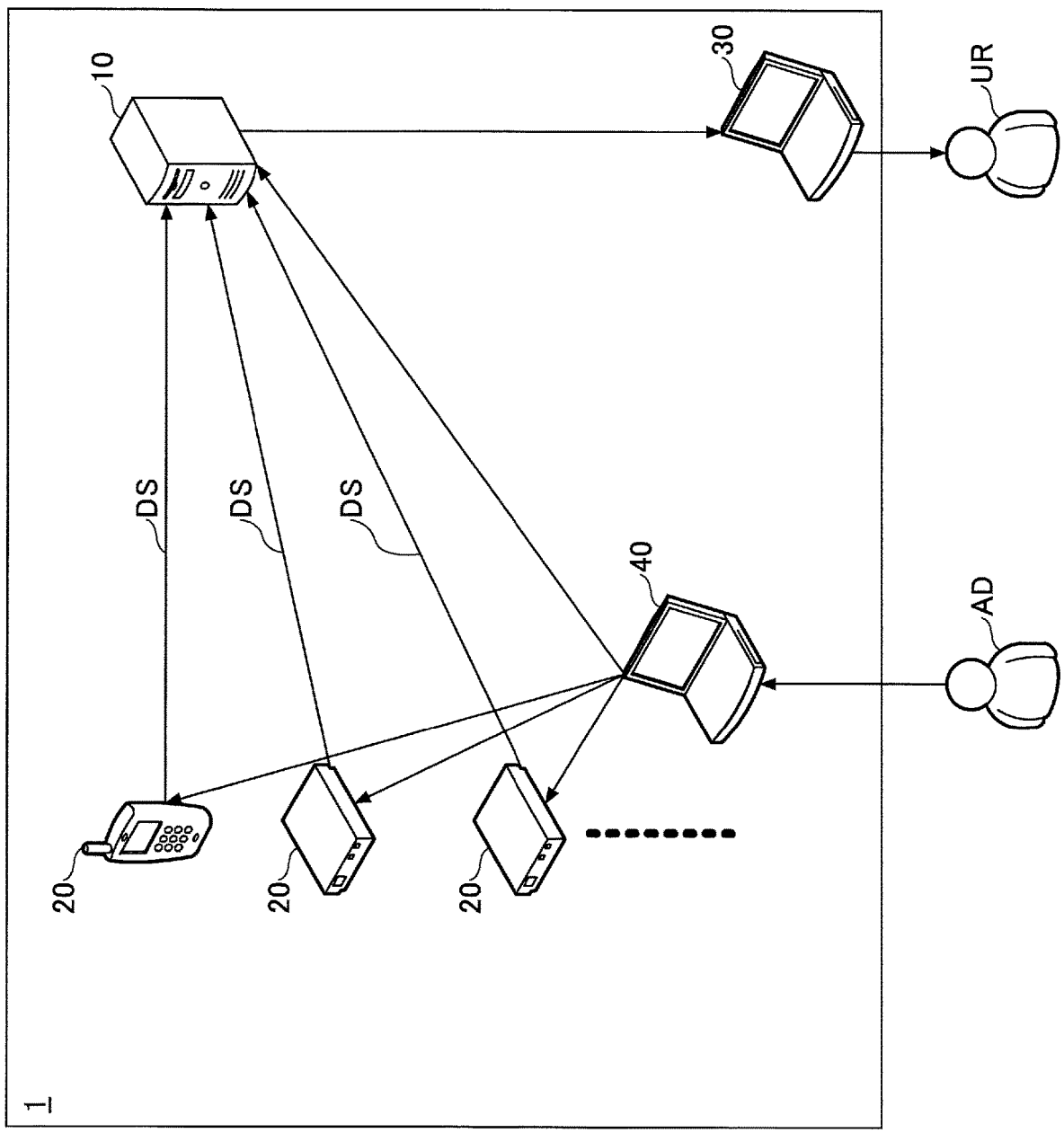
FIG. 1 is a conceptual diagram illustrating an example of an information processing system that uses an information processing apparatus according to an embodiment of the present invention.

In the following, an embodiment of the present invention will be described while making reference to the drawings. It should be noted that, in the present specification and the drawings, the same reference numeral is given to substantially the same element that has substantially the same functional structure, and duplicated descriptions will be omitted.

First Embodiment

<Overall Structure Example>

FIG. 1 is a conceptual diagram illustrating an example of an information processing system 1 that uses an information processing apparatus 10 according to an embodiment of the present invention. For example, the information processing apparatus 10 is used for the information processing system 1 with the following overall structure. As illustrated in the figure, the information processing system 1 includes a plurality of terminals 20 and the information processing apparatus 10.

Further, as illustrated in the figure, the information processing system 1 may further include a management apparatus 40, used by an administrator AD, for controlling each of the terminals 20 and the information processing apparatus 10, and an output terminal 30, used by a user UR, that is an example of a service providing destination.

The terminal 20 is, for example, a measuring device, a mobile terminal, a PC (Personal Computer), or the like. Further, the terminal 20 includes a communication device, and transmits, to the information processing apparatus 10, encrypted data DS that is in a difficult-to-decrypt state. It should be noted that, in the information processing system 1, the terminals 20 may be the same type of devices or different type of devices. Further, there may be one or more terminals 20.

First, the terminals 20 generate what is termed as "plain text data" by processing data indicating a measurement result obtained by using a sensor, etc., or by performing a predetermined process. Next, the terminals 20 generate encrypted data DS by encrypting the plain text data by executing an encryption algorithm.

For example, the terminals 20 may be installed in a factory, etc. Further, it is assumed that the terminals 20 are measuring devices for temperature measurement. In this case, each of the terminals 20 measures the temperature, and generates encrypted text data DS by encrypting plain text data indicating a temperature value obtained by the measurement. It should be noted that the terminals 20 may measure a physical property value other than the temperature. Alternatively, each of the terminals 20 may generate, not only a physical property value, but also another type of plain text data. Further, the encrypted text data DS is transmitted to an external apparatus, etc., periodically or when instructed by the external apparatus.

The information processing apparatus 10 is, for example, a server, or the like. It should be noted that the information processing apparatus 10 is not limited to a server, but may be a PC, etc. The information processing apparatus 10 performs a predetermined process including four arithmetic operations, logical operations, or a combination thereof, for the encrypted text data items DS received from the terminals 20. Further, the information processing apparatus 10 transmits the encrypted text data indicating a process result to the output terminal 30.

For example, it is assumed that the information processing system 1 is set to provide a service of providing the user UR with an average value of temperatures measured by the terminals 20. In this case, first, the information processing apparatus 10 receives, from each of the terminals 20, encrypted text data item DS in which data indicating the temperature is encrypted. Further, the information processing apparatus 10 performs averaging process by executing four arithmetic operations, logical operations, or a combination thereof, for the encrypted text data items DS, and outputs data indicating the average value to the output terminal 30 used by the user UR.

The output terminal 30 and the management apparatus 40 are, for example, PCs connected to the information processing apparatus 10 via a network. It should be noted that the output terminal 30 and the management apparatus 40 may be integrated into a single structure with the information processing apparatus 10, or the like. In other words, the information processing apparatus 10 may display a processing result for the user UR by using an output apparatus, or the like, included in the information processing apparatus 10. Further, the information processing apparatus 10 may receive an operation from the administrator AD by using an input apparatus, or the like, included in the information processing apparatus 10.

For example, there is a case in which: the information processing apparatus 10 is connected to a network, and receives various data items from the terminals 20 via the network; in other words, the information processing system 1 provides what is termed as a "cloud service", or the like. In this case, in order to reduce a risk of information leakage, or the like, each data item is transmitted after encryption as illustrated in the figure as the encrypted text data item DS.

In other words, the terminals 20 encrypt the plain text data items based on a predetermined encryption algorithm and key. In this way, because the encrypted text data item DS is transmitted in an encrypted state, even if it is stolen by unauthorized access after the transmission, a risk of information leakage, related to the content of the plain text data and the generation source of the encrypted text data DS, may be reduced. Further, the output terminal 30 receives the encrypted data, and decrypts the data based on a predetermined decryption algorithm and key. In this way, the user UR securely receives the provided cloud services, or the like.

<<Hardware Structure Example>>

Figure 2:
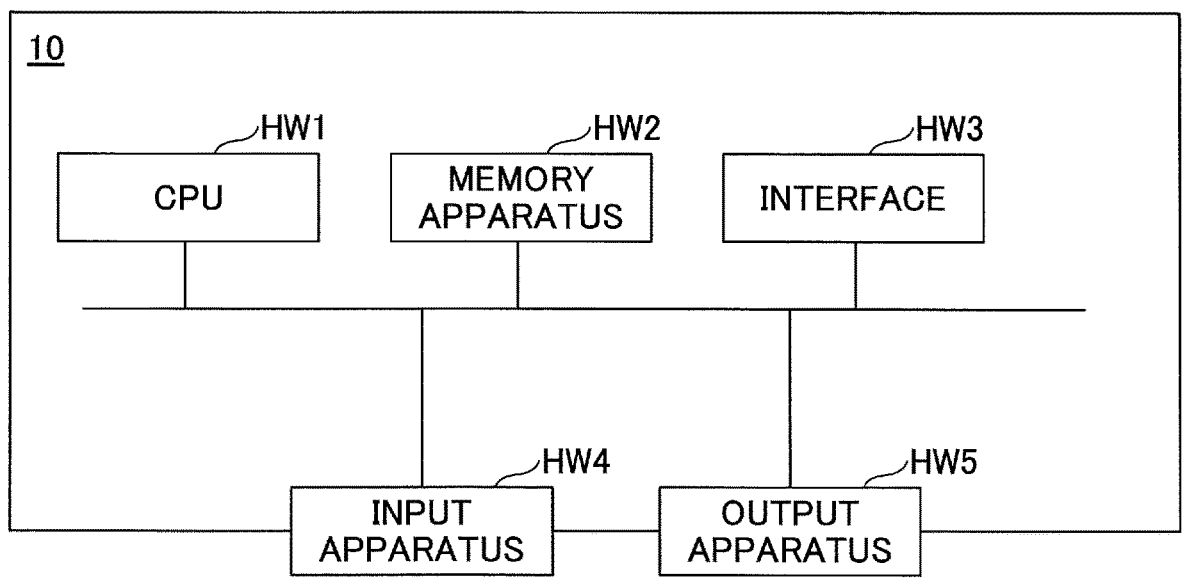
FIG. 2 is a block diagram illustrating an example of a hardware structure of the information processing apparatus.

FIG. 2 is a block diagram illustrating an example of a hardware structure of an information processing apparatus according to an embodiment of the present invention. For example, as illustrated in the figure, the information processing apparatus 10 has a hardware structure including a CPU (Central Processing Unit) HW1, a memory apparatus HW2, an interface HW3, an output apparatus HW4, and an output apparatus HW5.

The CPU HW1 is a calculation apparatus and is a control apparatus. Therefore, the CPU HW1 performs calculations and controls hardware in order to realize predetermined processes based on programs, or the like, installed in advance.

The memory apparatus HW2 is a main memory apparatus such as a memory, or the like. Further, the memory apparatus HW2 may further include an auxiliary memory apparatus such as a hard disk, or the like.

The interface HW3 is a connector, an antenna, etc., used for connecting an external apparatus. For example, the interface HW3 is used for transmitting and receiving data to and from an external apparatus connected via a cable, a near field communication, a network, etc.

The input apparatus HW4 is an apparatus used for inputting an operation by a user. For example, the input apparatus HW4 is a keyboard, a mouse, or the like.

The output apparatus HW5 is an apparatus used for outputting a process result, etc., for the user. For example, the output apparatus HW5 is a display apparatus, or the like.

It should be noted that the information processing apparatus 10 is not limited to the hardware structure illustrated in the figure. For example, the information processing apparatus 10 may include a plurality of each element. Further, the information processing apparatus 10 may include an external apparatus connected via a wired line or via radio. Further, the information processing apparatus 10 may include multiple apparatuses.

Further, the output terminal 30 and the management apparatus 40 are, for example, apparatuses with the same hardware structure as shown in the figure.

<Example of First Overall Processing>

Figure 3:
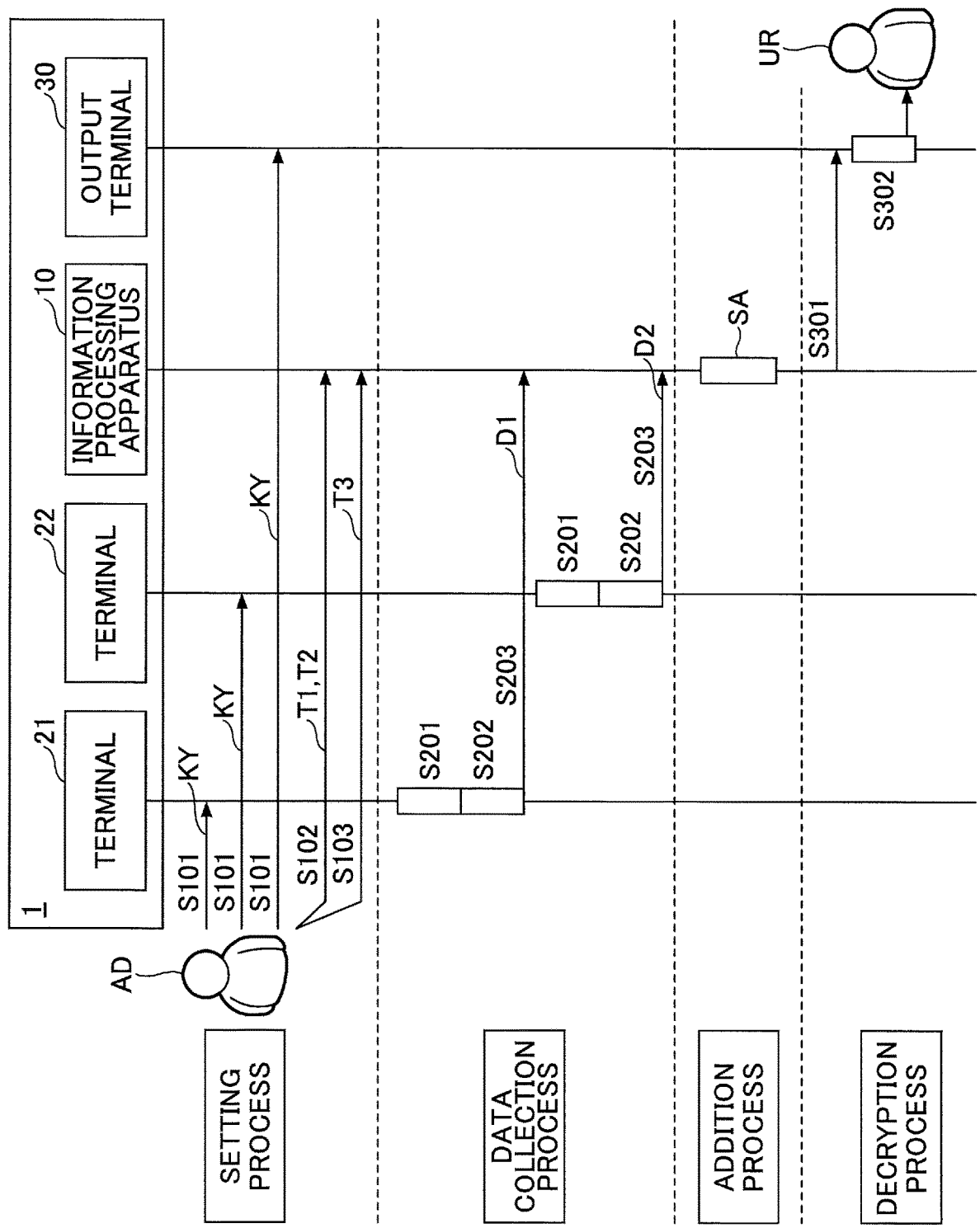
FIG. 3 is a sequence diagram illustrating an example of first overall processing by the information processing system.

FIG. 3 is a sequence diagram illustrating an example of first overall processing by an information processing system according to an embodiment of the present invention. For example, in the first overall processing, a setting process (step S101 through step S103) is performed first. After the setting process, in the first overall processing, data collection process (step S201 through step S203) is performed. After the data collection process, in the first overall processing, an addition process (step SA) is performed. Lastly, after the addition process, in the first overall processing, decryption process (step S301 and step S302) is performed. In the following, an example of the first overall processing illustrated in the figure will be described. Further, in this example, it is assumed that there are two terminals 21 and 22.

<Key Input Example> (Step S101)

In step S101, a key is input to each of the terminals 20 and the output terminal 30. Specifically, in a common key encryption method such as an AES method, or the like, a common key KY is used for encryption and decryption. Therefore, the administrator AD, or the like, inputs the same key KY to the terminal 21 and the terminal 22 that perform processing related to an encryption algorithm. With respect to the above, the administrator AD, or the like, inputs the same key KY to the output terminal 30 that performs processing related to a decryption algorithm.

In this way, the same key KY that is input to each of the terminals 20 is input to the output terminal 30. As a result, it is possible for the output terminal 30 to convert the encrypted text data into the plain text data by decrypting the encrypted data, encrypted by each of the terminals 20 according to the encryption algorithm, according to the decryption algorithm.

Further, a program for executing the encryption algorithm used in the AES method etc., is installed in each of the terminals 20 in advance. Each of the terminals 20 is configured to perform data encryption upon receiving the key KY.

<Input Example of First Table and Second Table> (Step S102)

In step S102, the information processing apparatus 10 stores a first table T1 and a second table T2. It should be noted that the first table T1 and the second table T2 are data used in the addition process (step SA) in the latter stage. Further, the first table T1 is a table defined based on a first constant "C1" and a second constant "C2" used as parameters in the addition process (step SA) in the latter stage. Similarly, the second table T2 is a table defined based on the first constant "C1" and a third constant "C3" used as parameters in the addition process (step SA) in the latter stage.

<Input Example of Third Table> (Step S103)

In step S103, the information processing apparatus 10 stores a third table T3. It should be noted that the third table T3 is data used in the addition process (step SA) in the latter stage. Further, the third table T3 is a table defined based on the first constant "C1", the second constant "C2", and the third constant "C3" used as parameters in the addition process (step SA) in the latter stage.

It should be noted that a table is data that defines an output for an input. For example, the table is what is termed as a "LUT (Look Up Table", or the like. In other words, the table may be any data as long as it can specify an output value to be output for an input value. It is not necessary for the table to have a data format such as a two-dimensional table, or the like. Further, each of the tables is data that can be generated when each of the constants is defined. The tables will be described in detail later.

The above-described setting process is performed in advance before the data collection process.

<Data Generation Example> (Step S201)

In step S201, the terminals 20 generate data. For example, in the case where the data is a measured value such as a temperature, the terminals 20 measure the physical property values via a sensor, or the like, and generate data indicating the measurement result. It should be noted that, in step S201, the data is in an un-encrypted state, and is, what is termed as, "plain text data".

<Encryption Processing Example> (Step S202)

In step S202, the terminals 20 encrypt the data. In other words, in step S202, the terminals 20 generate encrypted data by encrypting the data generated in step S201 according to an encryption algorithm, or the like. In other words, the encrypted data is data in an encrypted state (difficult-to-be-decrypted state).

<Transmission Example of Encrypted Data> (Step S203)

In step S203, the terminals 20 transmit the encrypted data. In the following, in this example, the encrypted data transmitted by the terminal 21 is referred to as "first data D1". Further, in this example, the encrypted data transmitted by the terminal 22 is referred to as "second data D2".

When the above-described steps S201 through S203 are performed by each of the terminals 20, the encrypted data items are collected by the information processing apparatus 10. It should be noted that the steps S201 through S203 may be periodically performed by the terminals 20 by defining a period in advance, or may be performed by the terminals 20 at a defined timing, input to each of the terminals 20 in advance, for performing the processing.

The above-described setting process is performed in advance before the addition process.

<Addition Process Example> (Step SA)

In step SA, the information processing apparatus 10 performs an addition process. In the following, an example will be described in which the first data D1 and the second data D2 are added. For example, the addition process is a process equivalent to formula (1) illustrated in FIG. 4.

FIG. 4 is a formula illustrating a calculation equivalent to an addition process by an information processing apparatus according to an embodiment of the present invention. It should be noted that, in formula (1) illustrated in the figure and in the following descriptions, "DP" indicates a plain text data item. Further, "DC" indicates an encrypted text data item (cipher text data item). A number is added after the "DP" or "DC", and when the same number is added after the "DP" and "DC", it indicates the relationship between the data items before and after the encryption. For example, when a plain text data item "DP1" is encrypted according to an encryption algorithm, the plain text data item "DP1" is encrypted to (converted to) the encrypted text data item "DC1". With respect to the above, when the encrypted text data item "DC1" is decrypted according to a decryption algorithm, the encrypted text data item "DC1" is decrypted to (converted to) the plain text data item "DP1".

Further, in formula (1) illustrated in the figure and in the following descriptions, "T" indicates transformation (conversion) according to a table. A number is added after the "T". The number indicates a table used for the transformation (conversion). For example, "T1($x$)" indicates a transformation using a first table T1. Therefore, "T1($x$)" indicates that "x" is input as a transformation target, and a transformation is performed in which "x" is transformed to an output, defined by the first table T1, corresponding to the "x".

Further, "Enc" indicates an encryption function, and "Dec" indicates a decryption function. Therefore, "Enc" and "Dec" are functions that satisfy relationships, "x=Dec[Enc(x)]" and "x=Enc[Dec(x)]". Therefore, in formula (1) and the following descriptions, the order of "Dec" and "Enc" is exchangeable.

Further, in formula (1), the remainder operation is indicated by "mod". For example, "x mod y" means calculating a remainder of "x" divided by "y".

In formula (1) illustrated in the figure and in the following descriptions, "C1" indicates a first constant. Further, "C2" indicates a second constant. Furthermore, "C3" indicates a third constant. Further, the second constant and the third constant have different values.

In formula (1) illustrated in the figure and in the following descriptions, "N" is a value indicating the number of data items (hereinafter, referred to as "the number of elements". When the number of bits of the encrypted text data is "n" (n=length (DC)), the number of elements, "N" and "n" have a relationship, "N=2n". In other words, "N" is an exponential number having "2" as a base and "n" as an exponent. Further, each of the encrypted text data items and each of the plain text data items are data items having the same number of bits.

Therefore, "n" is a value defined by the data length of the target encrypted text data item. Further, each of the constants is a parameter set for each process by the administrator AD, or the like. For example, each of the constants is a random number, or the like, generated by executing a random number generation function, or the like. Further, as illustrated in formula (1), the second constant "C2" and the third constant "C3" are any number selected from "0" through "N−1". With respect to the above, as illustrated in formula (1), the first constant "C1" is an odd number, and has a value equal to or less than "N−1".

For example, the information processing apparatus 10 realizes the formula (1) illustrated in the figure as follows.

Figure 5:
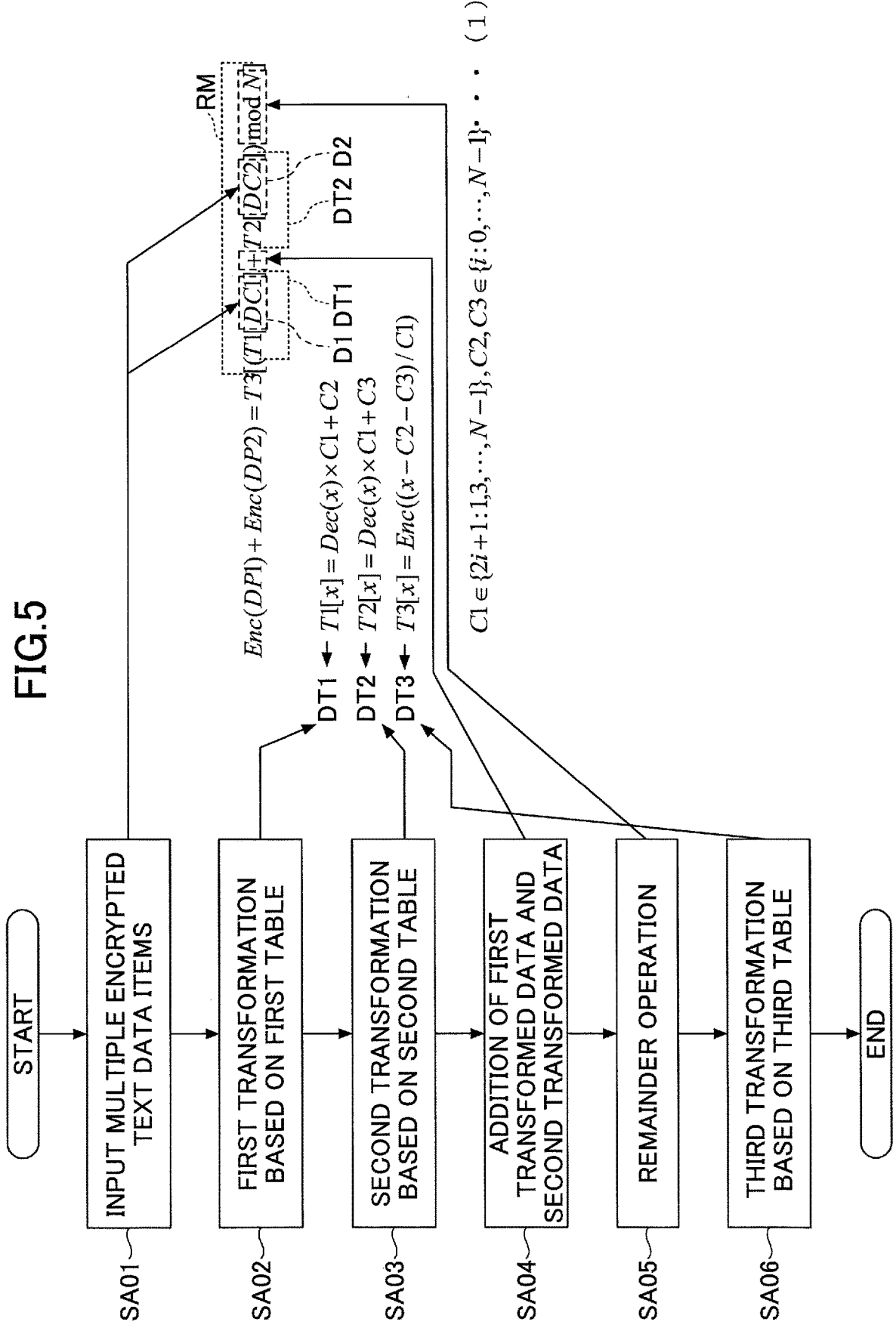
FIG. 5 is a flowchart illustrating an example of the addition process by the information processing apparatus.

FIG. 5 is a flowchart illustrating an example of the addition process by an information processing apparatus according to an embodiment of the present invention. In other words, in step SA, for example, a process illustrated in the figure is performed.

<Input Example of a Plurality of Encrypted Text Data Items> (Step SA01)

In step SA01, the information processing apparatus 10 inputs a plurality of encrypted text data items. For example, when encrypted text data items transmitted in step S203 are received, it is possible for the information processing apparatus 10 to input the encrypted text data items. The encrypted text data items that have been input as described above are "DC1" and "DC2" in formula (1).

<Example of First Transformation Based on First Table> (Step SA02)

In step SA02, the information processing apparatus 10 transforms the first data based on the first table. As illustrated in the figure, the information processing apparatus 10 transforms the first data D1, which is one of the encrypted text data items input in step SA01, by using the first table T1. Further, as illustrated in the figure, the first table T1 is a table used for performing a transformation equivalent to a calculation in which the second constant "C2" is added to a multiplication result obtained by multiplying data that has been obtained by decrypting the first data D1 as a transformation target, that is, plain text data of the first data D1, by the first constant "C1". Hereinafter, the data indicating a transformation result based on the first table T1, that is, the transformed data of the first data D1, is referred to as "first transformed data DT1".

<Example of Second Transformation Based on Second Table> (Step SA03)

In step SA03, the information processing apparatus 10 transforms the second data based on the second table. As illustrated in the figure, the information processing apparatus 10 transforms the second data D2, which is another encrypted text data item, of the encrypted text data items input in step SA01, different from the data item used in step SA02, that is, the first data. D1, by using the second table T2. Further, as illustrated in the figure, the second table T2 is a table used for performing a transformation equivalent to a calculation in which the third constant "C3", which is different from the second constant "C2" in step SA02, is added to a multiplication result obtained by multiplying data that has been obtained by decrypting the second data D2 as a transformation target, that is, plain text data of the second data D2, by the first constant "C1", which is the same first constant "C1" as in step SA02. Hereinafter, the data indicating a transformation result based on the second table T2, that is, the transformed data of the second data D2, is referred to as "second transformed data DT2".

<Example of Addition of the First Transformed Data and the Second Transformed Data> (Step SA04)

In step SA04, the information processing apparatus 10 adds the first transformed data and the second transformed data. In other words, in step SA04, the information processing apparatus 10 adds an output result of the first transformation according to step SA02 and an output result of the second transformation according to step SA03.

<Remainder Operation Example> (Step SA05)

In step SA05, the information processing apparatus 10 performs a remainder operation for the process result of step SA04. As illustrated in formula (1), the information processing apparatus 10 performs a remainder operation for an addition result of the first transformed data DT1 and the second transformed data DT2 with respect to "N", and calculates a remainder RM.

<Example of Third Transformation Based on Third Table> (Step SA06)

In step SA06, the information processing apparatus 10 transforms the remainder RM, that has been calculated by the remainder operation in step SA05, based on the third table. Further, as illustrated in the figure, the third table T3 is a table used for performing a transformation equivalent to a calculation in which a subtraction result, which has been obtained by subtracting the second constant "C2" and the third constant "C3", from the remainder RM as a transformation target, is divided by the first constant "C1".

When the addition process is performed as described above, an output result equivalent to an output result of adding the first plain text data item and the second plain text data item that are data items before encryption, is obtained. In the following, the proof will be described.

(Proof)

FIG. 6 is a formula for proving the equivalence of the addition process by an information processing apparatus according to an embodiment of the present invention. For example, the equivalence can be proved according to formula (2) illustrated in the figure. Further, there is a theorem as shown below.

FIG. 7 is a formula illustrating the theorem according to an embodiment of the present invention. Because of the theorem according to formula (3) illustrated in the figure, when a multiplication of an odd number is performed, an input and an output will be different values.

As is proved by formula (2) and formula (3), an output result, obtained by applying an addition process illustrated in FIG. 5 to the encrypted data of the first plain text data "DP1" and the encrypted data of the second plain text data "DP2", is equivalent to "Enc (DP1+DP2)" in which the first plain text data "DP1" and the second plain text data "DP2" are added in a plain text data state, and then, the added result is encrypted.

The above-described addition process is performed in advance before the decryption process.

<Data Generation Example> (Step S301)

Referring back to FIG. 3, in step S301, the information processing apparatus 10 transmits data indicating an output result of the addition process to the output terminal 30. It should be noted that the data transmitted in step S301 is encrypted text data because the addition process in step SA is performed in a state where the process target data is in an encrypted text data state.

<Decryption Process Example> (Step S302)

In step S302, the terminals 30 decrypts the data. In other words, in step S302, the terminals 30 generates plain text data by decrypting the data transmitted in step S301 according to a decryption algorithm, or the like. Therefore, the data is in a secure state during a period from step S201, in which the data has been encrypted by the terminal 20, to step S302, because the data is being in an encrypted state during the period. With respect to the above, the data is in a plain text data state after the data has been decrypted in step S302, and thus, it is possible for the user UR to know the contents of the data by referring to the data via an information processing apparatus, or the like.

In this way, it is possible for the user UR to know the addition result of the data items generated by the terminal 21 and the terminal 22.

Second Embodiment

The second embodiment may be realized by, for example, an overall structure similar to that of the first embodiment. Therefore, it is assumed that the overall structure of the second embodiment is similar to that of the first embodiment, and duplicated descriptions will be omitted. Further, a hardware structure of an information processing apparatus according to the second embodiment is, for example, similar to that of the first embodiment. Therefore, descriptions of the hardware structure will be also omitted.

However, overall processing in the second embodiment is different from that of the first embodiment. In the following, substantially the same processes and structures will be given the same reference numerals, and descriptions will be omitted.

<Example of Second Overall Processing>

Figure 8:
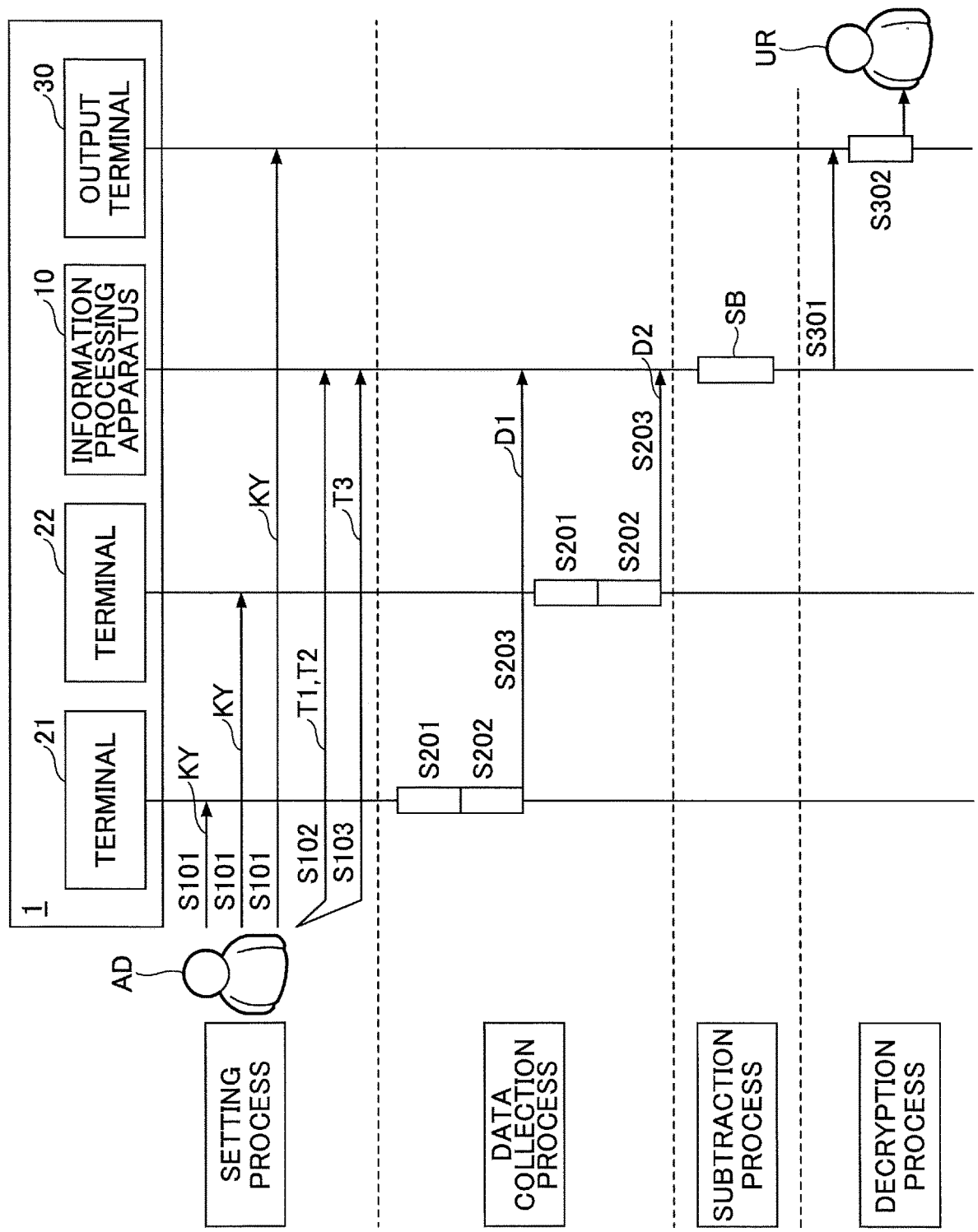
FIG. 8 is a sequence diagram illustrating an example of second overall processing by the information processing system.

FIG. 8 is a sequence diagram illustrating an example of second overall processing by an information processing system according to the second embodiment. The second overall processing is different from the first overall processing in that the addition process (step SA) is replaced with a subtraction process (step SB). With respect to the above, the setting process, the data collection process, and the decryption process are similar to those of the first overall processing.

<Subtraction Process Example> (Step SB)

In step SB, the information processing apparatus 10 performs a subtraction process. In the following, similar to the first embodiment, an example will be described in which the first data D1 and the second data D2 are processing targets. For example, the subtraction process is a process equivalent to formula (4) illustrated in FIG. 9.

FIG. 9 is a formula illustrating a calculation equivalent to a subtraction process by an information processing apparatus according to an embodiment of the present invention. It should be noted that the variables and the operators in formula (4) are the same as in formula (1). When formula (4) is compared with formula (1), the second table T2 is different. Specifically, the second embodiment is different from the first embodiment in that, when transformation according to the second table T2 is performed, a transformation result in formula (1) is further multiplied by "minus 1 (−1)". For example, the information processing apparatus 10 realizes the formula (4) illustrated in the figure as follows.

Figure 10:
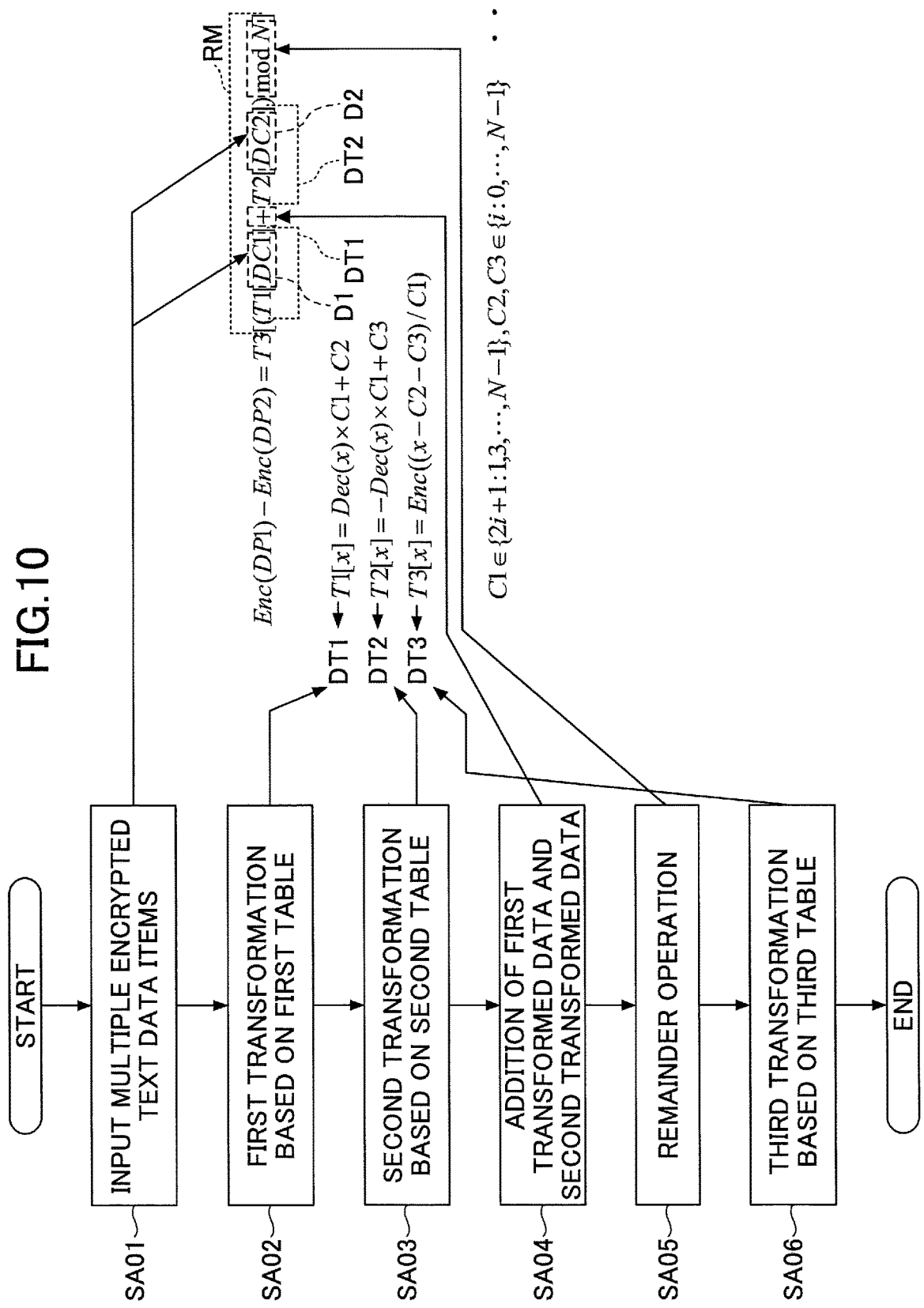
FIG. 10 is a flowchart illustrating an example of the subtraction process by the information processing apparatus.

FIG. 10 is a flowchart illustrating an example of the subtraction process by an information processing apparatus according to an embodiment of the present invention. As illustrated in the figure, the subtraction process can be realized by a process, for example, similar to the addition process (step SA). The subtraction process is different from the addition process in that the second table T2 used in step SA03 is different from that of the addition process.

As illustrated in formula (4), in the subtraction process, the second table T2 is a table used for performing a transformation equivalent to a calculation in which the third constant "C3", which is different from the second constant "C2" in step SA02, is added to a multiplication result obtained by multiplying data that has been obtained by decrypting the second data D2 as a transformation target, that is, plain text data of the second data D2, by the first constant "C1", which is the same as the first constant "C1" in step SA02, and by further multiplying the multiplied result by "minus 1 (−1)".

Hereinafter, when the similar processes as in the first embodiment are performed, the subtraction process is realized. When the subtraction process is performed as described above, an output result, equivalent to an output result of subtracting the second plain text data item from the first plain text data item that are data items before encryption, is obtained. In the following, the proof will be described.

(Proof)

FIG. 11 is a formula for proving the equivalence of the subtraction process by an information processing apparatus according to an embodiment of the present invention. For example, the equivalence can be proved according to formula (5) illustrated in the figure.

As is proved by formula (5) and formula (3), an output result, obtained by applying a subtraction process illustrated in FIG. 10 to the encrypted data of the first plain text data "DP1" and the encrypted data of the second plain text data "DP2", is equivalent to "Enc (DP1−DP2)" in which the first plain text data "DP1" is subtracted by the second plain text data "DP2" in a plain text data state, and then, the subtracted result is encrypted.

The above-described subtraction process is performed in advance before the decryption process. When the decryption process is performed similar to the first overall processing in the subsequent process, it is possible for the user UE to refer to the plain text data.

In this way, it is possible for the user UR to know the subtraction result of the data items generated by the terminal 21 and the terminal 22 by referring to the plain text data.

<Example of Functional Structure of Information Processing Apparatus According to the First Embodiment and the Second Embodiment>

Figure 12:
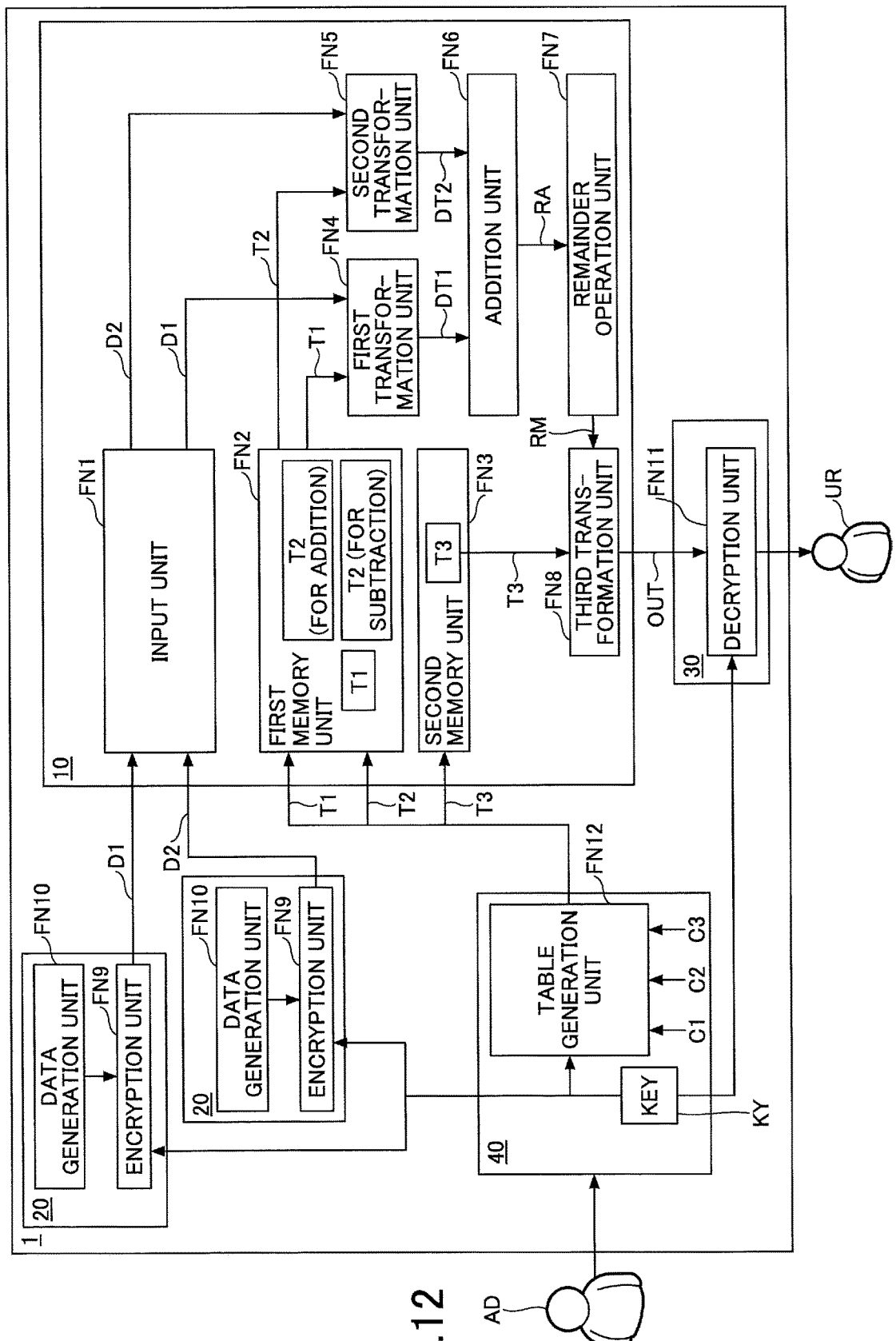
FIG. 12 is a functional block diagram illustrating a functional structure example of an information processing apparatus according to a first embodiment and a second embodiment of the present invention.

FIG. 12 is a functional block diagram illustrating an example of a functional structure of an information processing apparatus 10 according to the first embodiment and the second embodiment. For example, the information processing apparatus 10 has a functional structure including an input unit FN1, a first memory unit FN2, a second memory unit FN3, a first transformation unit FN4, a second transformation unit FN5, an addition unit FN6, a remainder operation unit FN7, and a third transformation unit FN8.

Further, in the information processing system 1, for example, a plurality of terminals 20, an output terminal 30, and a management apparatus 40 are connected to the information processing apparatus 10 via a network, or the like.

Each of the terminals 20 has a functional structure including, for example, an encryption unit FN9 and a data generation unit FN10.

The output terminal 30 has a functional structure including, for example, a decryption unit FN11. A key KY is input to the decryption unit FN11 in advance, and the decryption unit FN11 decrypts encrypted text data based on the key KY.

The management apparatus 40 has a functional structure including, for example, a table generation unit FN12.

The input unit FN1 performs an input procedure in which the first data D1 and the second data D2 are input. For example, the input unit FN1 is realized by the interface HW3 (refer to FIG. 2), or the like.

The first memory unit FN2 stores the first table T1 and the second table T2 according to a first memory procedure. For example, the first memory unit FN2 is realized by the memory apparatus HW2 (refer to FIG. 2), or the like.

The second memory unit FN3 stores the third table T3 according to a second memory procedure. For example, the second memory unit FN3 is realized by the memory apparatus HW2 (refer to FIG. 3), or the like.

The first transformation unit FN4 performs a first transformation procedure in which the first data D1 is transformed into the first transformed data DT1 based on the first table T1. For example, the first transformation unit FN4 is realized by the CPU HW1 (refer to FIG. 2), or the like.

The second transformation unit FN5 performs a second transformation procedure in which the second data D2 is transformed into the second transformed data DT2 based on the second table T2. For example, the second transformation unit FN5 is realized by the CPU HW1 (refer to FIG. 2), or the like.

The addition unit FN6 performs an addition procedure in which: the first transformed data DT1 and the second transformed data DT2 are added; and the added result RA is output to the remainder operation unit FN7. For example, the addition unit FN6 is realized by the CPU HW1 (refer to FIG. 2), or the like.

The remainder operation unit FN7 performs a remainder operation procedure in which a remainder RM is obtained by dividing the addition result RA by an exponential number having 2 as a base and having the number of bits of the first data D1 and the second data D2 as an exponent. For example, the remainder operation unit FN7 is realized by the CPU HW1 (refer to FIG. 2), or the like.

The third transformation unit FN8 performs a third transformation procedure in which an output result OUT, obtained by transforming the remainder RM based on the third table T3, is transmitted to the output terminal 30. For example, the third transformation unit FN8 is realized by the CPU HW1 (refer to FIG. 3), or the like.

As illustrated in the figure, a common key KY is transmitted to each of the terminals 20 and the output terminal 30. When the key KY is transmitted as described above, it is possible for the terminals 20 to encrypt data to be transmitted based on the key KY. With respect to the above, it is possible for the output terminal 30 to decrypt the output result OUT by using the key KY.

First, based on an operation by the administrator AD, the management apparatus 40 generates a key KY. Further, based on an operation by the administrator AD, the management apparatus 40 generates encryption parameters including the first constant "C1", the second constant "C2", the third constant "C3", etc. When the key KY, the first constant "C1", the second constant "C2", and the third constant "C3" are defined as described above, the management apparatus 40 generates the first table T1, the second table T2, and the third table T3 by using the table generation unit FN12. For example, the table generation unit FN12 is realized by an operation apparatus, or the like, included in the management apparatus 40.

The key KY generated as described above is transmitted to each of the terminals 20 and the output terminal 30 according to the setting process illustrated in FIG. 3 and FIG. 8. With respect to the above, each of the tables generated based on the key KY, the first constant "C1", the second constant "C2", and the third constant "C3" is transmitted to the information processing apparatus 10 according to the setting process illustrated in FIG. 3 and FIG. 8.

Further, each of the terminals 20 generates plain text data according to the data generation unit FN10. For example, in the case where the data is a measurement result, the data generation unit FN10 generates the data when measurement is performed by a sensor included in the terminal 20.

Next, each of the terminals 20 encrypts the plain text data generated by the data generation unit FN10 according to the encryption unit FN9. For example, the encryption unit FN9 and the data generation unit FN10 are realized by an operation apparatus, or the like, included in each of the terminals 20. In this way, the encrypted text data is generated by each of the terminals 20. The encrypted text data items of the first data D1, the second data D2, etc., generated as described above, are collected by the information processing apparatus 10. For example, the data collection process illustrated in FIG. 3 and FIG. 8 is realized by, for example, the input unit FN1, the encryption unit FN9, the data generation unit FN10, etc.

As illustrated in the figure, the addition process illustrated in FIG. 3 can be realized by the information processing apparatus 10 when the first transformation by the first transformation unit FN4, the second transformation by the second transformation unit FN5, the addition by the addition unit FN6, the remainder operation by the remainder operation unit FN7, and the third transformation by the third transformation unit FN8, are performed. Further, the addition process is, for example, a process illustrated in FIG. 5. In this way, as proved according to formula (2) (refer to FIG. 6), it is possible for the information processing apparatus 10 to obtain data equivalent to what is obtained by adding the plain text data items and by encrypting the addition result. In other words, even when the data is in an encrypted state (difficult-to-be-decrypted state), it is possible for the information processing apparatus 10 to add a plurality of the data items.

As illustrated in the figure, the subtraction process illustrated in FIG. 8 can be realized by the information processing apparatus 10 when the first transformation by the first transformation unit FN4, the second transformation by the second transformation unit FN5, the addition by the addition unit FN6, the remainder operation by the remainder operation unit FN7, and the third transformation by the third transformation unit FN8, are performed. Further, the subtraction process is, for example, a process illustrated in FIG. 10. In this way, as proved according to formula (5) (refer to FIG. 11), it is possible for the information processing apparatus 10 to obtain data equivalent to what is obtained by applying subtraction to the plain text data items and by encrypting the subtraction result. In other words, even when the data is in an encrypted state, it is possible for the information processing apparatus 10 to apply subtraction to a plurality of the data items.

Further, it is preferable that the information processing apparatus 10 perform both of the addition process illustrated in FIG. 3 and the subtraction process illustrated in FIG. 8. In other words, it is possible for the information processing apparatus 10 to output to the output terminal 30 both of the encrypted text data items equivalent to the addition result of the data items generated by the terminals 20, and equivalent to the subtraction result of the data items generated by the terminals 20. As described above, in the case where the information processing apparatus 10 performs both of the subtraction process and the addition process, it is preferable that the information processing apparatus 10 store, for example, each of the tables illustrated in the figure.

Specifically, it is preferable that the information processing apparatus 10 use a common first table T1 and a common third table T3 in the addition process and the subtraction process as illustrated in the figure. In other words, as illustrated in the figure, even in the case where the information processing apparatus 10 performs both of the addition process and the subtraction process, a single first table T1 is stored by the first memory unit FN2. Similarly, even in the case where the information processing apparatus 10 performs both of the addition process and the subtraction process, a single third table T3 is stored by the second memory unit FN3. Therefore, the first transformation unit FN4 uses the same first table T1 in case of performing the addition process and in case of performing the subtraction process. Similarly, the third transformation unit FN8 uses the same third table T3 in case of performing the addition process and in case of performing the subtraction process.

With respect to the above, in the case where the information processing apparatus 10 performs both of the addition process and the subtraction process, a second table T2 for the addition process and a second table T2 for the subtraction process are stored, respectively. Further, the second transformation unit FN5 switches the second table T2 according to whether the addition process is performed or the subtraction process is performed.

According to the arrangement described above, because the first table T1 and the third table T3 are used in common, it is possible for the information processing apparatus 10 to make a memory area, used for storing the first table T1 and the third table T3, smaller.

Third Embodiment

The third embodiment may be realized by, for example, an overall structure similar to that of the first embodiment.

Therefore, it is assumed that the overall structure of the third embodiment is similar to that of the first embodiment, and duplicated descriptions will be omitted. Further, a hardware structure of an information processing apparatus according to the third embodiment is, for example, similar to that of the first embodiment. Therefore, descriptions of the hardware structure will be also omitted.

However, overall processing in the third embodiment is different from that of the first embodiment. In the following, substantially the same processes and structures will be given the same reference numerals, and descriptions will be omitted.

<Example of Third Overall Processing>

Figure 13:
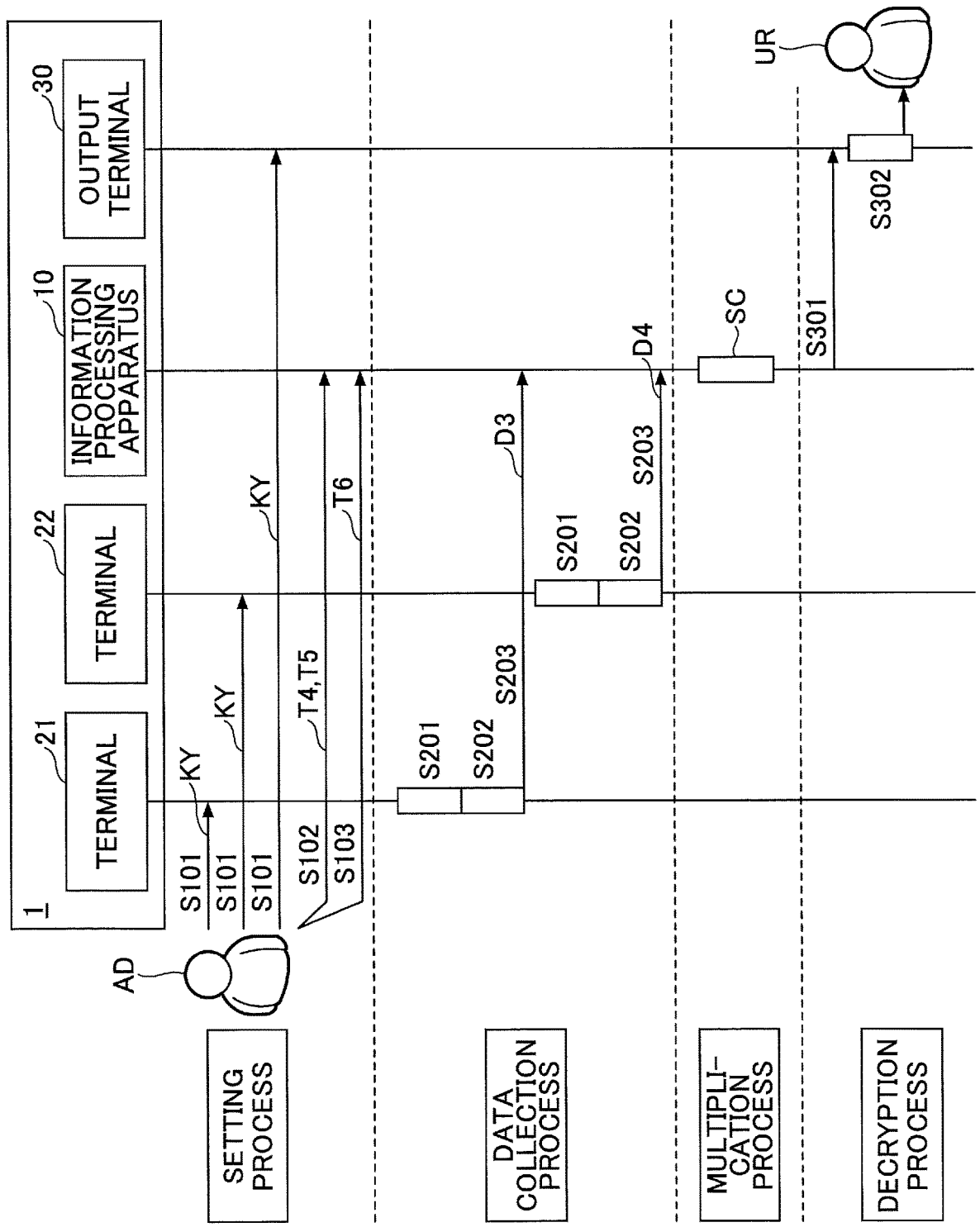
FIG. 13 is a sequence diagram illustrating an example of third overall processing by the information processing system.

FIG. 13 is a sequence diagram illustrating an example of third overall processing by an information processing system according to the third embodiment. The third overall processing is different from the first overall processing in that the addition process (step SA) is replaced with a multiplication process (step SC). With respect to the above, the setting process, the data collection process, and the decryption process are similar to those of the first overall processing. However, the constants and the tables used in the setting process are different from those used in the first overall processing and the second overall processing. The constants and the tables will be described in detail later.

<Multiplication Process Example> (Step SC)

In step SC, the information processing apparatus 10 performs a multiplication process. In the following, similar to the first embodiment, etc., an example will be described in which the processing targets are third data D3 and fourth data D4 that are the encrypted text data items transmitted from the terminals 20. For example, the multiplication process is a process equivalent to formula (6) illustrated in FIG. 14.

FIG. 14 is a formula illustrating a calculation equivalent to a multiplication process by an information processing apparatus according to an embodiment of the present invention. It should be noted that the variables and the operators in formula (6) are the same as in formula (1).

For example, the information processing apparatus 10 realizes the formula (6) illustrated in the figure as follows.

Figure 15:
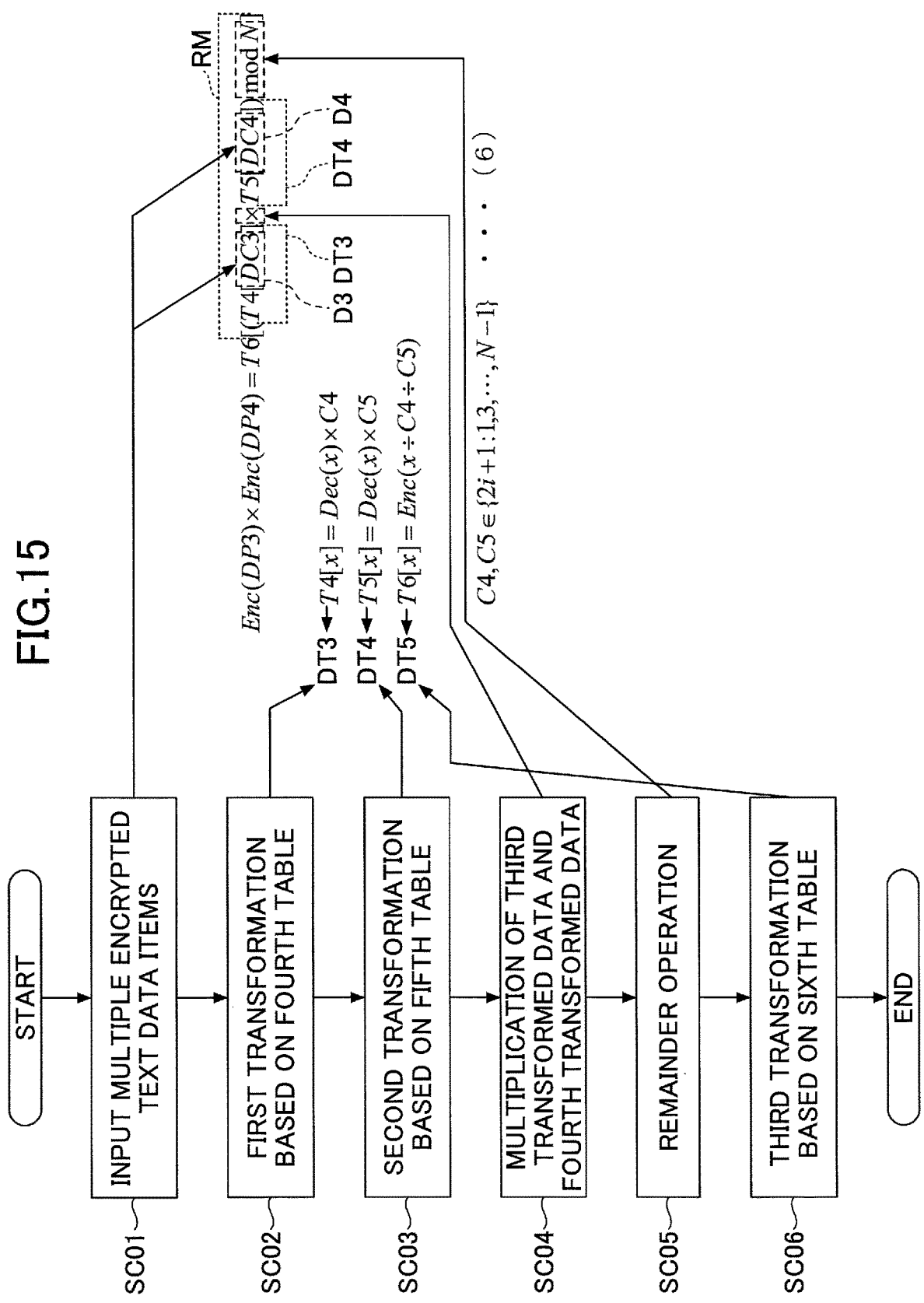
FIG. 15 is a flowchart illustrating an example of the multiplication process by the information processing apparatus.

FIG. 15 is a flowchart illustrating an example of the multiplication process by the information processing apparatus 10. In other words, in step SC, for example, a process illustrated in the figure is performed.

<Input Example of a Plurality of Encrypted Text Data Items> (Step SC01)

In step SC01, the information processing apparatus 10 inputs a plurality of encrypted text data items. For example, when encrypted text data items transmitted in step S203 are received, it is possible for the information processing apparatus 10 to input the encrypted text data items. The encrypted text data items that have been input as described above are "DC3" and "DC4" in formula (6).

<Example of First Transformation Based on Fourth Table> (Step SC02)

In step SC02, the information processing apparatus 10 transforms the third data based on the fourth table. As illustrated in the figure, the information processing apparatus 10 transforms the third data D3, which is one of the encrypted text data items input in step SC01, by using the fourth table T4. Further, as illustrated in formula (6), the fourth table T4 is a table used for performing a transformation equivalent to a calculation in which the data obtained by decrypting the third data D3 as a transformation target, that is, the plain text data of the third data D3, is multiplied by the fourth constant "C4". Hereinafter, the data indicating a transformation result based on the fourth table T4, that is, the transformed data of the third data D3, is referred to as "third transformed data DT3".

<Example of Second Transformation Based on Fifth Table> (Step SC03)

In step SC03, the information processing apparatus 10 transforms the fourth data based on the fifth table. As illustrated in the figure, the information processing apparatus 10 transforms the fourth data D4, which is another encrypted text data item, of the encrypted text data items input in step SC01, different from the data used in step SC02, that is, the third data D3, by using the fifth table T5. Further, as illustrated in formula (6), the fifth table T5 is a table used for performing a transformation equivalent to a calculation in which the data obtained by decrypting the fourth data D4 as a transformation target, that is, the plain text data of the fourth data D4, is multiplied by the fifth constant "C5". Hereinafter, the data indicating a transformation result based on the fifth table T5, that is, the transformed data of the fourth data D4, is referred to as "fourth transformed data DT4".

<Example of Multiplication of the Third Transformed Data and the Fourth Transformed Data>

(step SC04)

In step SC04, the information processing apparatus 10 multiplies the third transformed data by the fourth transformed data. In other words, in step SC04, the information processing apparatus 10 multiplies an output result of the first transformation according to step SC02 by an output result of the second transformation according to step SC03.

<Remainder Operation Example> (Step SC05)

In step SC05, the information processing apparatus 10 performs a remainder operation for the process result of step SC04. As illustrated in formula (6), the information processing apparatus 10 performs a remainder operation for a multiplication result of the third transformed data DT3 by the fourth transformed data DT4 with respect to "N", and calculates a remainder RM.

<Example of Third Transformation Based on Sixth Table> (Step SC06)

In step SC06, the information processing apparatus 10 transforms the remainder RM, that has been calculated by the remainder operation in step SC05, based on the sixth table. Further, as illustrated in formula (6), the sixth table T6 is a table used for performing a transformation equivalent to a calculation in which the remainder RM as a transformation target is divided by the fourth constant "C4" and the fifth constant "C5". When the multiplication process is performed as described above, an output result equivalent to an output result of multiplying the third plain text data item by the fourth plain text data item that are data items before encryption, is obtained. In the following, the proof will be described.

(Proof) FIG. 16 is a formula for proving the equivalence of the multiplication process by an information processing apparatus according to an embodiment of the present invention. For example, the equivalence can be proved according to formula (7) illustrated in FIG. 16.

As is proved by formula (7) and formula (3), an output result, obtained by applying a multiplication process illustrated in FIG. 15 to the encrypted data of the third plain text data "DP3" and the encrypted data of the fourth plain text data "DP4", is equivalent to "Enc (DP3*DP4)" in which the third plain text data "DP3" is multiplied by the fourth plain text data "DP4" in a plain text data state, and the multiplication result is encrypted.

The above-described multiplication process is performed in advance before the decryption process. When the decryption process is performed similar to the first overall processing in the subsequent process, it is possible for the user UE to refer to the plain text data.

In this way, it is possible for the user UR to know the multiplication result of the data items generated by the terminal 21 and the terminal 22 by referring to the plain text data.

Fourth Embodiment

The fourth embodiment may be realized by, for example, an overall structure similar to that of the first embodiment. Therefore, it is assumed that the overall structure of the fourth embodiment is similar to that of the first embodiment, and duplicated descriptions will be omitted. Further, a hardware structure of an information processing apparatus according to the fourth embodiment is, for example, similar to that of the first embodiment. Therefore, descriptions of the hardware structure will be also omitted.

However, overall processing in the fourth embodiment is different from that of the first embodiment. In the following, substantially the same processes and structures will be given the same reference numerals, and descriptions will be omitted.

<Example of Fourth Overall Processing>

Figure 17:
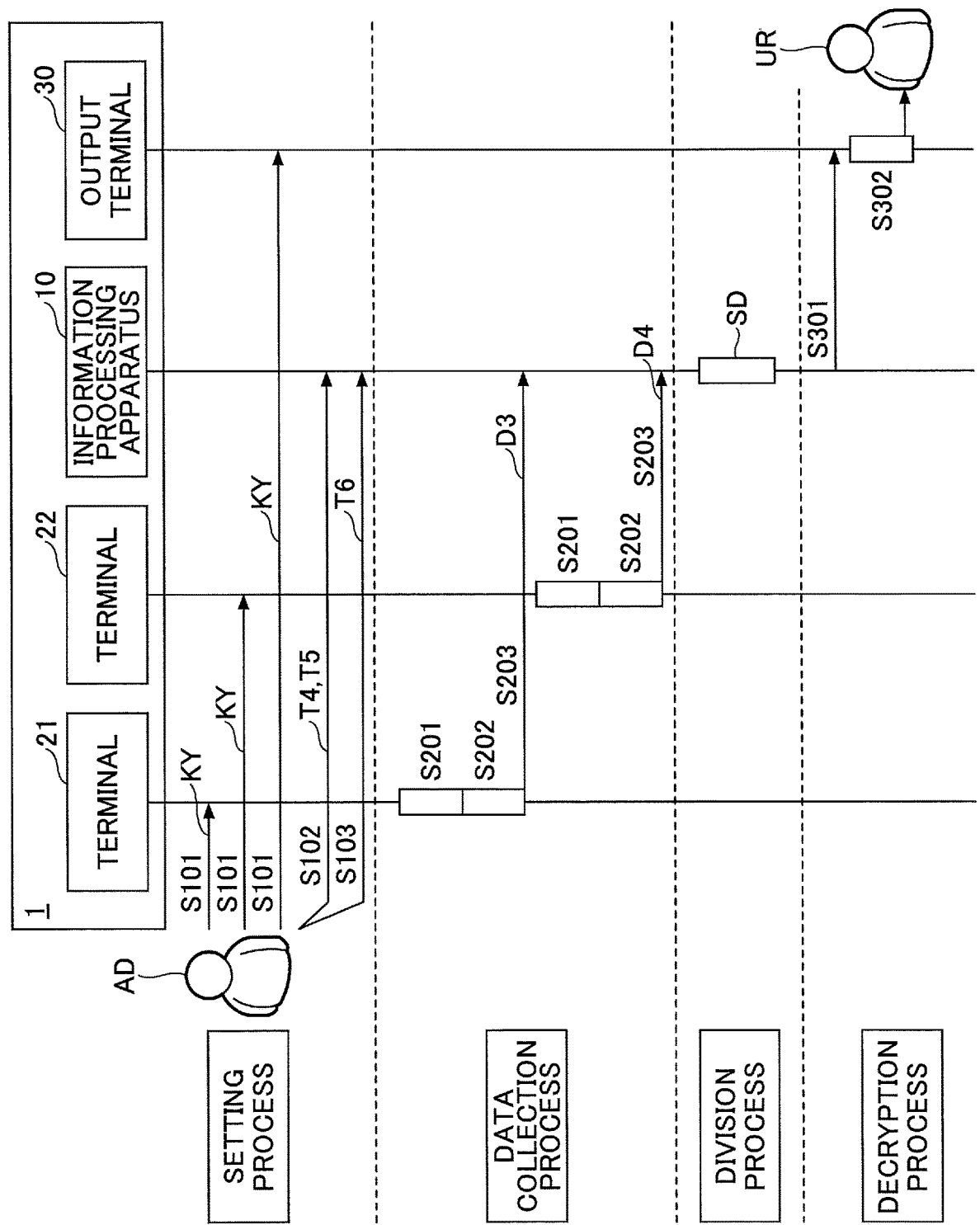
FIG. 17 is a sequence diagram illustrating an example of fourth overall processing by the information processing system.

FIG. 17 is a sequence diagram illustrating an example of fourth overall processing by an information processing system according to the fourth embodiment. The fourth overall processing is different from the first overall processing in that the addition process (step SA) is replaced with a division process (step SD). With respect to the above, the setting process, the data collection process, and the decryption process are similar to those of the third overall processing.

<Division Process Example> (Step SD)

In step SD, the information processing apparatus 10 performs a division process. In the following, similar to the third embodiment, an example will be described in which processing targets are the third data D3 and the fourth data D4. For example, the division process is a process equivalent to formula (8) illustrated in FIG. 18.

FIG. 18 is a formula illustrating a calculation equivalent to a division process by an information processing apparatus according to an embodiment of the present invention. It should be noted that the variables and the operators in formula (8) are the same as in formula (1).

For example, the information processing apparatus 10 realizes the formula (8) illustrated in the figure as follows. When formula (8) is compared with formula (6), the fifth table T5 is different. Specifically, the fourth embodiment is different in that the transformation based on the fifth table T5 is equivalent to a calculation in which, first, a reciprocal of the transformation target is calculated, and then, the calculated result is multiplied by the fifth constant "C5". For example, the information processing apparatus 10 realizes the formula (8) illustrated in the figure as follows.

Figure 19:
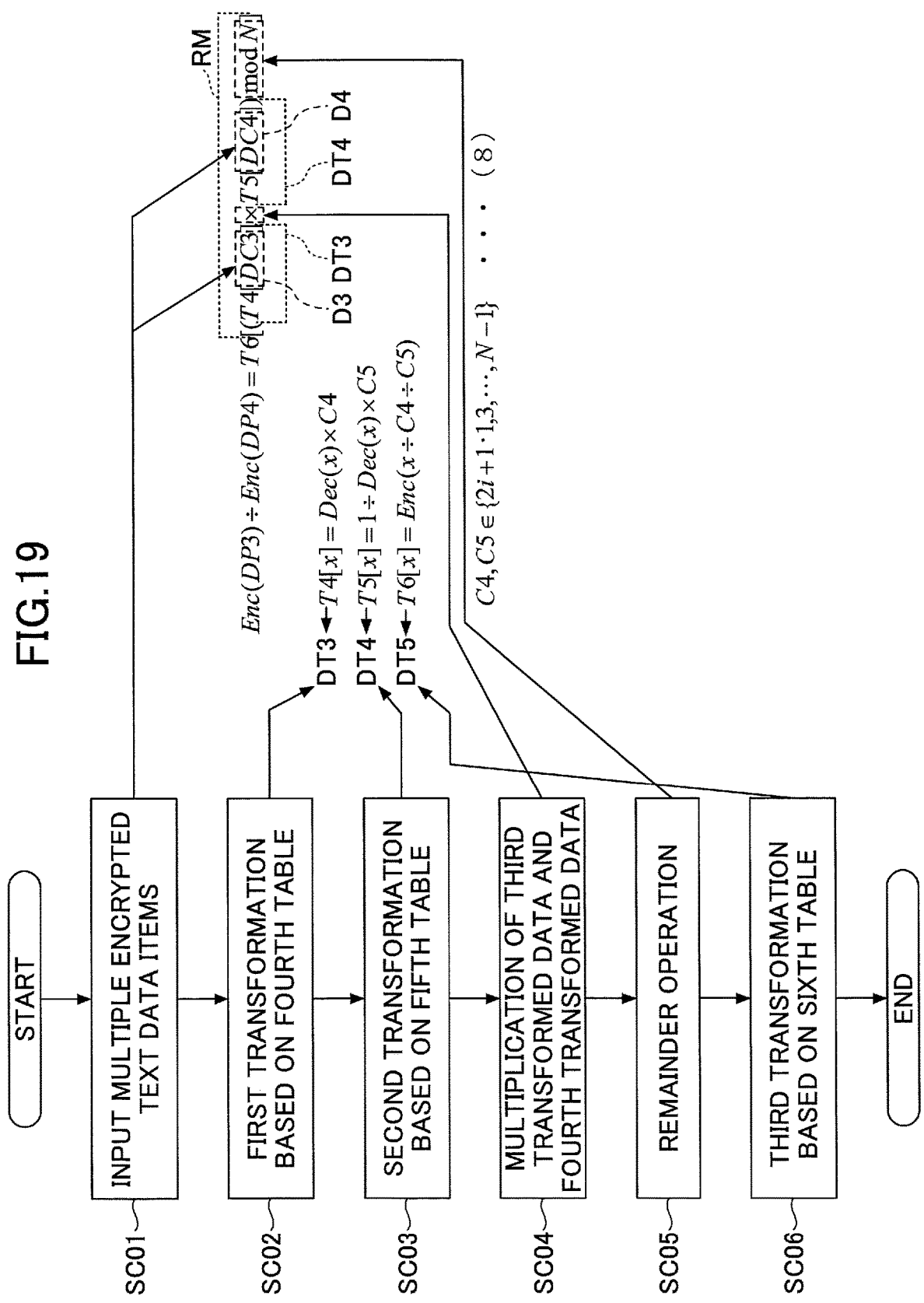
FIG. 19 is a flowchart illustrating an example of the division process by the information processing apparatus.

FIG. 19 is a flowchart illustrating an example of the division process by the information processing apparatus 10. As illustrated in the figure, the division process can be realized by a process, for example, similar to the multiplication process (step SC). However, the division process is different from the multiplication process in that the fifth table T5 used in step SC03 is different from that of the multiplication process.

As illustrated in formula (8), the fifth table T5 is a table used for performing a transformation equivalent to a calculation in which a reciprocal is calculated for the data obtained by decrypting the fourth data D4 as a transformation target, that is, the plain text data of the fourth data D4 (1/Dec(x)), and the calculated reciprocal is multiplied by the fifth constant "C5" that is different from step SC02. With respect to the above, the fourth table T4 and the sixth table T6 used in the division process are the same as the tables used in the multiplication process.

Regarding the subsequent process, the division process can be realized by performing the similar process as in the third embodiment. When the division process is performed as described above, an output result equivalent to an output result of division of the first plain text data item by the second plain text data item that are data items before encryption, is obtained. In the following, the proof will be described.

(Proof)

FIG. 20 is a formula for proving the equivalence of the division process by an information processing apparatus according to an embodiment of the present invention. For example, the equivalence can be proved according to formula (9) illustrated in FIG. 16.

As is proved by formula (9) and formula (3), an output result, obtained by applying a division process illustrated in FIG. 19 to the encrypted data of the third plain text data "DP3" and the encrypted data of the fourth plain text data "DP4", is equivalent to "Enc (DP3/DP4)" in which the third plain text data "DP3" is divided by the fourth plain text data "DP4" in a plain text data state, and the division result is encrypted.

The above-described division process is performed in advance before the decryption process. When the decryption process is performed similar to the first overall processing in the subsequent process, it is possible for the user UE to refer to the plain text data.

In this way, it is possible for the user UR to know the division result of the data items generated by the terminal 21 and the terminal 22 by referring to the plain text data.

<Example of Functional Structure of Information Processing Apparatus According to the Third Embodiment and the Fourth Embodiment>

Figure 21:
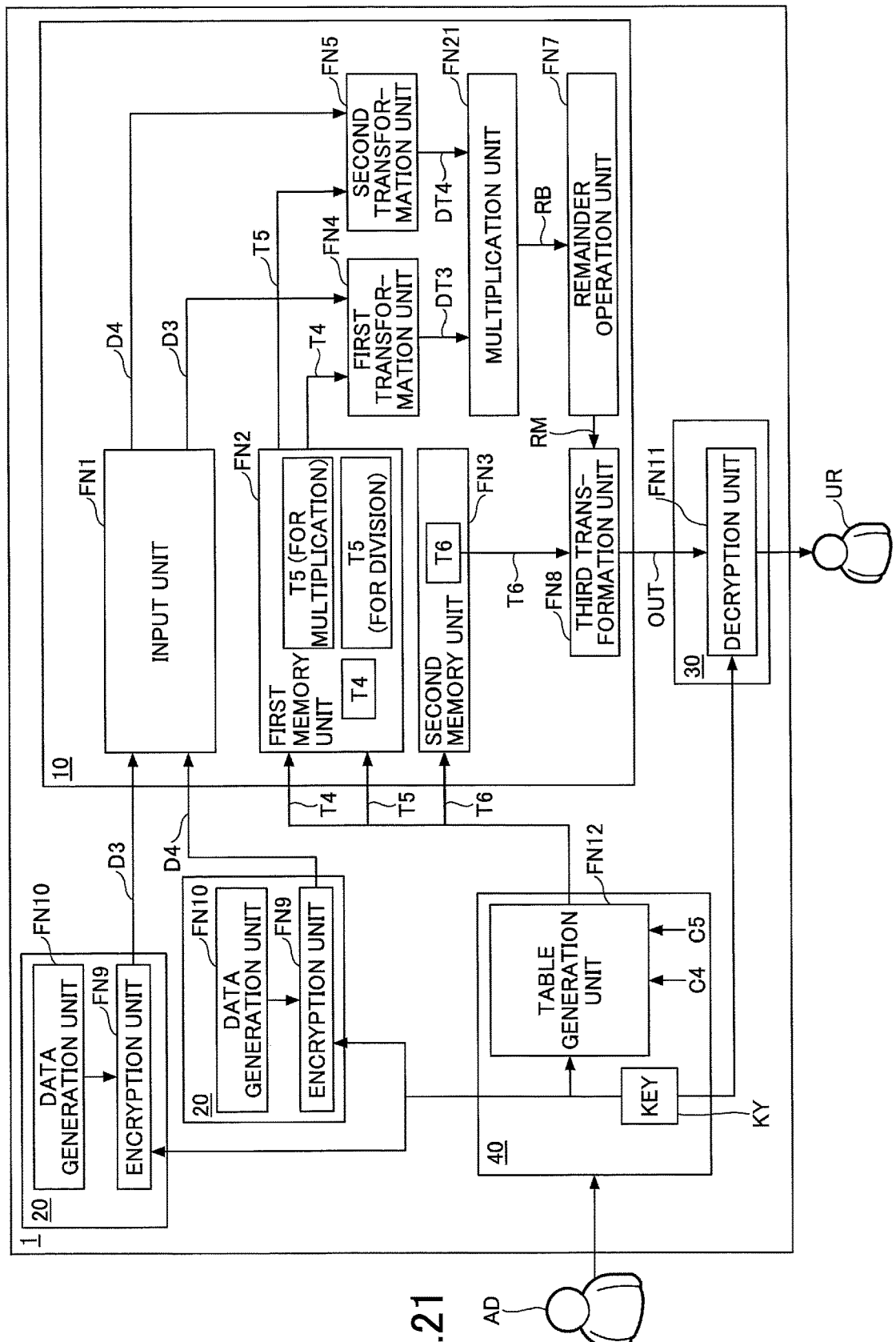
FIG. 21 is a functional block diagram illustrating a functional structure example of an information processing apparatus according to a third embodiment and a fourth embodiment of the present invention.

FIG. 21 is a functional block diagram illustrating an example of a functional structure of an information processing apparatus 10 according to the third embodiment and the fourth embodiment. For example, the information processing apparatus 10 has a functional structure including an input unit FN1, a first memory unit FN2, a second memory unit FN3, a first transformation unit FN4, a second transformation unit FN5, a multiplication unit FN21, a remainder operation unit FN7, and a third transformation unit FN8. The functional structure illustrated in FIG. 21 is different from the functional structure illustrated in FIG. 12 in that the addition unit FN6 is replaced with the multiplication unit FN21. With respect to the above, the terminals 20, the output terminal 30, the management apparatus 40, etc., are the same as those in FIG. 12, and thus, descriptions will be omitted.

The input unit FN1 performs an input procedure in which the third data D3 and the fourth data D4 are input. For example, the input unit FN1 is realized by the interface HW3 (refer to FIG. 2), or the like.

The first memory unit FN2 stores the fourth table T4 and the fifth table T5 according to a first memory procedure. For example, the first memory unit FN2 is realized by the memory apparatus HW2 (refer to FIG. 2), or the like.

The second memory unit FN3 stores the sixth table T6 according to a second memory procedure. For example, the second memory unit FN3 is realized by the memory apparatus HW2 (refer to FIG. 3), or the like.

The first transformation unit FN4 performs a first transformation procedure in which the third data D3 is transformed into the third transformed data DT3 based on the fourth table T4. For example, the first transformation unit FN4 is realized by the CPU HW1 (refer to FIG. 2), or the like.

The second transformation unit FN5 performs a second transformation procedure in which the fourth data D4 is transformed into the fourth transformed data DT4 based on the fifth table T5. For example, the second transformation unit FN5 is realized by the CPU HW1 (refer to FIG. 2), or the like.

The multiplication unit FN21 performs a multiplication procedure in which: the third transformed data DT3 is multiplied by the fourth transformed data DT4; and the multiplication result is output to the remainder operation unit FN7. For example, the multiplication unit FN21 is realized by the CPU HW1 (refer to FIG. 2), or the like.

The remainder operation unit FN7 performs a remainder operation procedure in which a remainder RM is obtained by dividing the multiplication result RB by an exponential number having 2 as a base and having the number of bits of the third data D3 and the fourth data D4 as an exponent. For example, the remainder operation unit FN7 is realized by the CPU HW1 (refer to FIG. 2), or the like.

The third transformation unit FN8 performs a third transformation procedure in which an output result OUT, obtained by transforming the remainder RM based on the sixth table T6, is transmitted to the output terminal 30. For example, the third transformation unit FN8 is realized by the CPU HW1 (refer to FIG. 3), or the like.

As illustrated in the figure, a common key KY is transmitted to each of the terminals 20 and the output terminal 30. When the key KY is transmitted as described above, it is possible for the terminals 20 to encrypt data to be transmitted based on the key KY. With respect to the above, it is possible for the output terminal 30 to decrypt the output result OUT according to the key KY.

First, based on an operation by the administrator AD, the management apparatus 40 generates a key KY. Further, based on an operation by the administrator AD, the management apparatus 40 generates encryption parameters including the fourth constant "C4", the fifth constant "C5", etc. When the key KY, the fourth constant "C4", and the fifth constant "C5" are defined as described above, the management apparatus 40 generates the fourth table T4, the fifth table T5, and the sixth table T6 by using the table generation unit FN12. For example, the table generation unit FN12 is realized by an operation apparatus, or the like, included in the management apparatus 40.

The key KY, generated as described above, is transmitted to each of the terminals 20 and the output terminal 30 according to the setting process illustrated in FIG. 13 and FIG. 17. With respect to the above, each of the tables generated based on the fourth constant "C4" and the fifth constant "C5" is transmitted to the information processing apparatus 10 according to the setting process illustrated in FIG. 13 and FIG. 17.

Further, each of the terminals 20 generates plain text data according to the data generation unit FN10. For example, in the case where the data is a measurement result, the data generation unit FN10 generates the data when measurement is performed by a sensor included in the terminal 20.

Next, each of the terminals 20 encrypts the plain text data generated by the data generation unit FN10 according to the encryption unit FN9. For example, the encryption unit FN9 and the data generation unit FN10 are realized by an operation apparatus, or the like, included in each of the terminals 20. In this way, the encrypted text data is generated by each of the terminals 20. The encrypted text data items of the third data D3, the fourth data D4, etc., generated as described above, are collected by the information processing apparatus 10. For example, the data collection process illustrated in FIG. 13 and FIG. 17 is realized by the input unit FN1, the encryption unit FN9, the data generation unit FN10, etc.

As illustrated in the figure, the multiplication process illustrated in FIG. 13 can be realized by the information processing apparatus 10 when the first transformation by the first transformation unit FN4, the second transformation by the second transformation unit FN5, the multiplication by the multiplication unit FN21, the remainder operation by the remainder operation unit FN7, and the third transformation by the third transformation unit FN8, are performed. Further, the multiplication process is, for example, a process illustrated in FIG. 15. In this way, as proved according to formula (7) (refer to FIG. 16), it is possible for the information processing apparatus 10 to obtain data equivalent to what is obtained by applying multiplication to the plain text data items and by encrypting the multiplication result. In other words, even when the data is in an encrypted state, it is possible for the information processing apparatus 10 to apply multiplication to a plurality of the data items.

As illustrated in the figure, the division process illustrated in FIG. 17 can be realized by the information processing apparatus 10 when the first transformation by the first transformation unit FN4, the second transformation by the second transformation unit FN5, the multiplication by the multiplication unit FN21, the remainder operation by the remainder operation unit FN7, and the third transformation by the third transformation unit FN8, are performed. Further, the division process is, for example, a process illustrated in FIG. 19. In this way, as proved according to formula (9) (refer to FIG. 20), it is possible for the information processing apparatus 10 to obtain data equivalent to what is obtained by applying division to the plain text data items and by encrypting the division result. In other words, even when the data is in an encrypted state, it is possible for the information processing apparatus 10 to apply division to a plurality of the data items.

Further, it is preferable that the information processing apparatus 10 perform both of the multiplication process illustrated in FIG. 13 and the division process illustrated in FIG. 17. In other words, it is possible for the information processing apparatus 10 to output to the output terminal 30 both of the encrypted text data items equivalent to the multiplication result of the data items generated by the terminals 20 and to the division result of the data items generated by the terminals 20. As described above, in the case where the information processing apparatus 10 performs both of the multiplication process and the division process, it is preferable that the information processing apparatus 10 store, for example, each of the tables illustrated in the figure.

Specifically, it is preferable that the information processing apparatus 10 use a common fourth table T4 and a common sixth table T6 in the multiplication process and the division process as illustrated in the figure. In other words, as illustrated in the figure, even in the case where the information processing apparatus 10 performs both of the multiplication process and the division process, a single fourth table T4 is stored by the first memory unit FN2. Similarly, even in the case where the information processing apparatus 10 performs both of the multiplication process and the division process, a single sixth table T6 is stored by the second memory unit FN3. Therefore, the first transformation unit FN4 uses the same fourth table T4 in case of performing the multiplication process and in case of performing the division process. Similarly, the third transformation unit FN8 uses the same sixth table T6 in case of performing the multiplication process and in case of performing the division process.

With respect to the above, in the case where the information processing apparatus 10 performs both of the multiplication process and the division process, a fifth table T5 for the multiplication process and a fifth table T5 for the division process are stored, respectively. Further, the second transformation unit FN5 switches the fifth table T5 according to whether the multiplication process is performed or the division process is performed.

According to the arrangement described above, because the fourth table T4 and the sixth table T6 are used in common, it is possible for the information processing apparatus 10 to make a memory area, used for storing the fourth table T4 and the sixth table T6, smaller.

Fifth Embodiment

The fifth embodiment may be realized by, for example, an overall structure similar to that of the first embodiment. Therefore, it is assumed that the overall structure of the fifth embodiment is similar to that of the first embodiment, and duplicated descriptions will be omitted. Further, a hardware structure of an information processing apparatus according to the fifth embodiment is, for example, similar to that of the first embodiment. Therefore, descriptions of the hardware structure will be also omitted.

However, overall processing in the fifth embodiment is different from that of the first embodiment. In the following, substantially the same processes and structures will be given the same reference numerals, and descriptions will be omitted.

<Example of Fifth Overall Processing>

Figure 22:
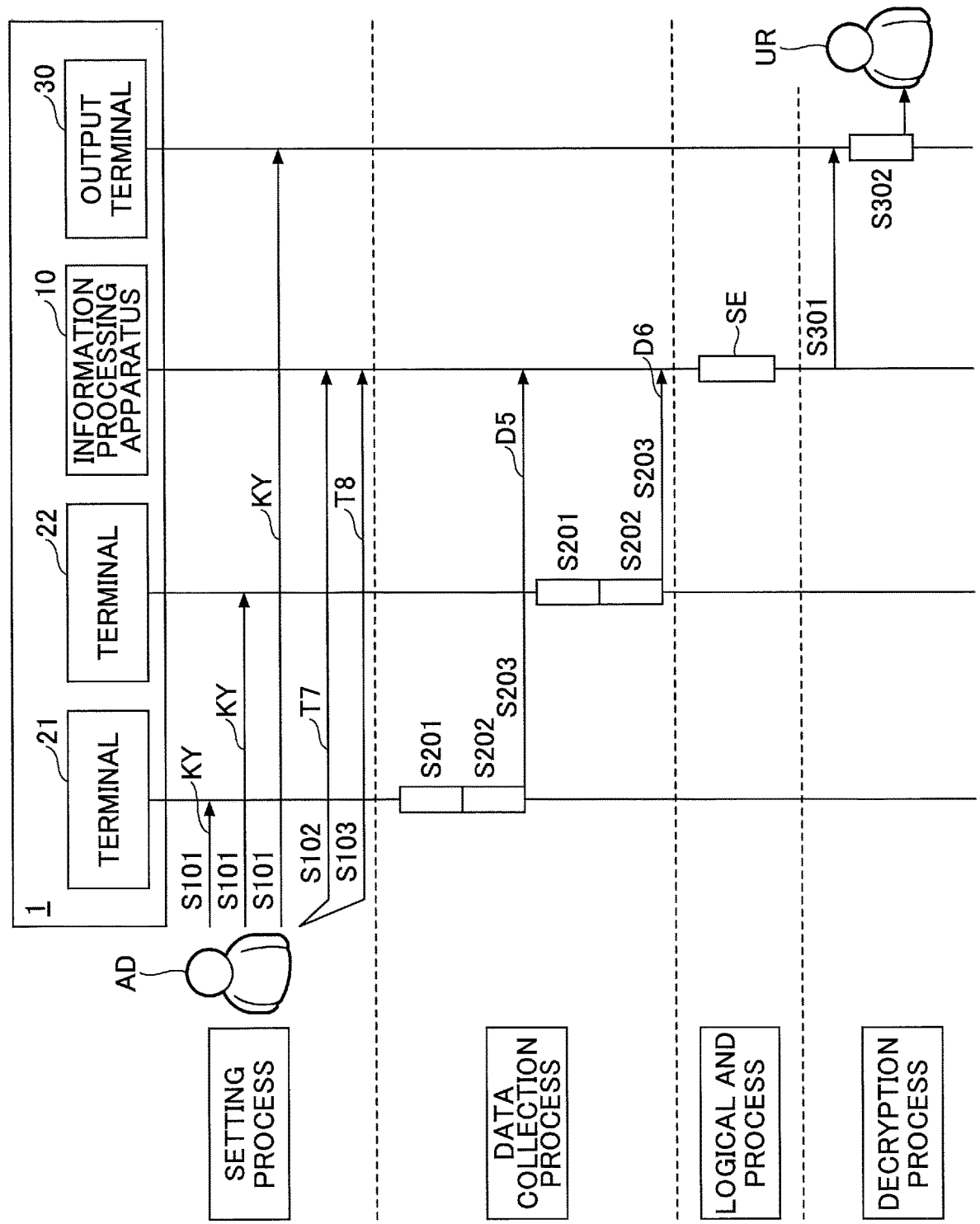
FIG. 22 is a sequence diagram illustrating an example of fifth overall processing by the information processing system.

FIG. 22 is a sequence diagram illustrating an example of fifth overall processing by an information processing system according to the fifth embodiment. The fifth overall processing is different from the first overall processing in that the addition process (step SA) is replaced with a logical AND process (step SE). With respect to the above, the setting process, the data collection process, and the decryption process are similar to those of the first overall processing. However, the constants and the tables used in the setting process are different from those used in the first overall processing through the fourth overall processing. The constants and the tables will be described in detail later.

<Logical AND Process Example> (Step SE)

In step SE, the information processing apparatus 10 performs a logical AND process. In the following, similar to the first embodiment, etc., an example will be described in which the processing targets are fifth data D5 and sixth data D6 that are the encrypted text data items transmitted from the terminals 20. For example, the logical AND process is a process equivalent to formula (10) illustrated in FIG. 23.

FIG. 23 is a formula illustrating a calculation equivalent to a logical AND process by an information processing apparatus according to an embodiment of the present invention. It should be noted that "Enc" and "Dec" in formula (10) mean the same things as those in formula (1). Further, "T" means the similar table as in formula (1). Further, similar to those in formula (1), "DP" and "DC" in formula (10) indicate plain text data and encrypted text data, respectively.

In formula (10) and in the following descriptions, "Sort (NM,x)" is a rearrangement (sorting) function for rearranging a plurality of bits included in the transformation target data. Further, "NM" indicates a rearrangement number, and "x" indicates transformation target data. The rearrangement function is used for calculating, based on the rearrangement number, a rearrangement destination for each of the bits included in the transformation target data "X", and rearranging each of the bits based on the calculated rearrangement destination. With respect to the above, "InvSort(NM, x)" is an inverse function of "Sort(NM, x)". When the inverse function is performed, the inverse transformation is applied to the transformation target data. In other words, the rearrangement function and the inverse function of the rearrangement function satisfy the relationships: "x=InvSort (NM, Sort(NM, x))" and "x=Sort(NM, InvSort(NM, x))". Therefore, in formula (10) and the following descriptions, the order of "Sort" and "InvSort" is exchangeable.

The rearrangement number is a number that can specify a rearrangement pattern based on the rearrangement function "Sort(NM, x)" and the inverse function "InvSort(NM, x)". Therefore, when the rearrangement number is the same, the rearrangement function "Sort(NM, x)" and the inverse function "InvSort(NM, x)" provide rearrangement to be the same pattern. In other words, for example, in the case where the rearrangement target data is 8-bit data (n=8), there exist "n!=8!=40320" rearrangement patterns.

It should be noted that detailed descriptions of the rearrangement function, the inverse function of the rearrangement function, and the rearrangement number may be found, for example, in the Japanese Patent Application No. 2016-110105.

Further, in formula (10) and in the following descriptions, "&" is an operator indicating a logical AND, or what is termed as "AND" operation.

For example, the information processing apparatus 10 realizes the formula (10) illustrated in the figure as follows.

Figure 24:
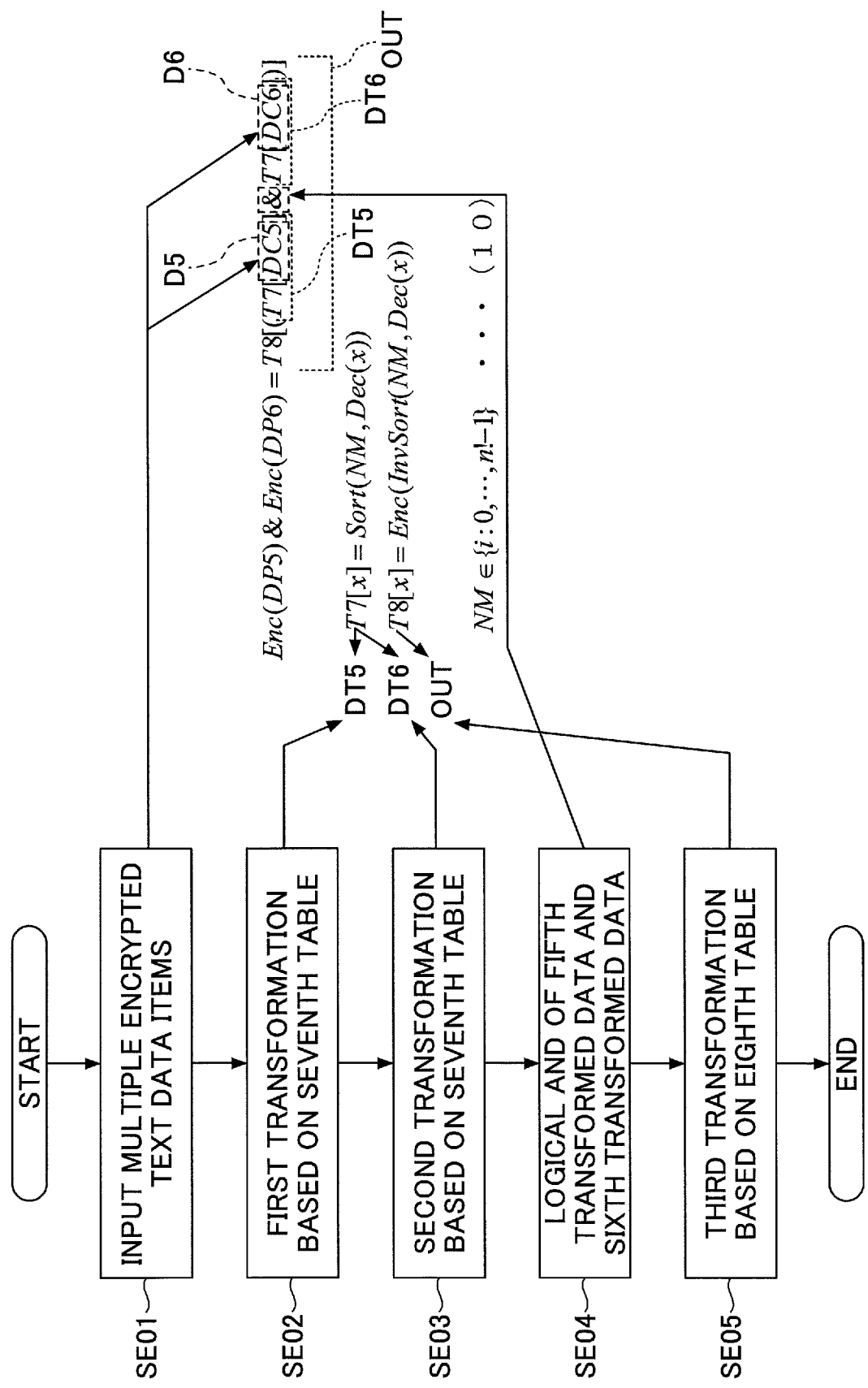
FIG. 24 is a flowchart illustrating an example of the logical AND process by the information processing apparatus.

FIG. 24 is a flowchart illustrating an example of the logical AND process by an information processing apparatus according to an embodiment of the present invention.

<Input Example of a Plurality of Encrypted Text Data Items> (Step SE01)

In step SE01, the information processing apparatus 10 inputs a plurality of encrypted text data items. For example, when encrypted text data items, the fifth data D5 and the sixth data D6, transmitted in step S203 are received, it is possible for the information processing apparatus 10 to input the encrypted text data items. The encrypted text data items that have been input as described above are "DC5" and "DC6" in formula (10).

<Example of First Transformation Based on Seventh Table> (Step SE02)

In step SE02, the information processing apparatus 10 transforms the fifth data based on the seventh table. As illustrated in the figure, the information processing apparatus 10 transforms the fifth data D5, which is one of the encrypted text data items input in step SE01, by using the seventh table T7. Further, as illustrated in formula (10), the seventh table T7 is a table used for performing a transformation equivalent to a calculation in which the data, obtained by decrypting the fifth data D5 as a transformation target, that is, the plain text data of the fifth data D5, is rearranged according to the rearrangement function. It should be noted that which rearrangement pattern is to be applied is defined by the rearrangement number NM. Hereinafter, the data, indicating a result of transformation in which the fifth data D5 is transformed according to the seventh table T7, is referred to as "fifth transformed data DT5".

<Example of Second Transformation Based on Seventh Table> (Step SE03)

In step SE03, the information processing apparatus 10 transforms the sixth data based on the seventh table. As illustrated in the figure, the information processing apparatus 10 transforms the sixth data D6, which is another of the encrypted text data items input in step SE01, different from the data used in step SE02, by using the seventh table T7 that is the same table as used in step SE02. Further, as illustrated in formula (10), the seventh table T7 is a table used for performing a transformation equivalent to a calculation in which the data, obtained by decrypting the sixth data D6 as a transformation target, that is, the plain text data of the sixth data D6, is rearranged according to the rearrangement function. Hereinafter, the data, indicating a result of transformation in which the sixth data D6 is transformed according to the seventh table T7, is referred to as "sixth transformed data DT6".

<Calculation Example of Logical AND of the Fifth Transformed Data and the Sixth Transformed Data> (Step SE04)

In step SE04, the information processing apparatus 10 calculates logical AND of the fifth transformed data by the sixth transformed data. In other words, in step SE04, the information processing apparatus 10 calculates logical AND of a transformed result according to step SE02 and a transformed result according to step SE03.

<Example of Third Transformation Based on Eighth Table> (Step SE05)

In step SE05, the information processing apparatus 10 transforms data based on the eighth table. As illustrated in the figure, the transformation target is the data indicating a result of the logical AND according to step SE04. Further, as illustrated in formula (10), the eighth table T8 is a table used for performing a transformation equivalent to a calculation in which the data, obtained by decrypting the transformation target data, that is, the plain text data of the data indicating a result of the logical AND, is rearranged according to the inverse function of the rearrangement function. Further, the transformed result according to the eighth table T8 is an output result OUT of the logical AND process.

When the logical AND process is performed as described above, an output result, equivalent to a result of calculating the logical AND of the fifth plain text data and the sixth plain text data that are data items before encryption, is obtained. In the following, the proof will be described.

(Proof)

FIG. 25 is a formula for proving the equivalence of the logical AND process by an information processing apparatus according to an embodiment of the present invention. For example, the equivalence can be proved according to formula (11) illustrated in FIG. 25.

As is proved by formula (11), an output result, obtained by applying a logical AND process illustrated in FIG. 24 to the encrypted data of the fifth plain text data "DP5" and the encrypted data of the sixth plain text data "DP6", is equivalent to "Enc (DP5&DP6)" in which the logical AND of the fifth plain text data "DP5" and the sixth plain text data "DP6" is calculated in a plain text state, and the calculated result is encrypted.

The above-described logical AND process is performed in advance before the decryption process. When the decryption process is performed similar to the first overall processing in the subsequent process, it is possible for the user UE to refer to the plain text data.

In this way, it is possible for the user UR to know the calculation result of the logical AND of the data items generated by the terminal 21 and the terminal 22 by referring to the plain text data.

It should be noted that the information processing apparatus 10 may further calculate the negation (NOT) of the output result OUT. In this way, it is possible for the information processing apparatus 10 to obtain a calculation result of logical NAND.

Sixth Embodiment

The sixth embodiment may be realized by, for example, an overall structure similar to that of the first embodiment. Therefore, it is assumed that the overall structure of the sixth embodiment is similar to that of the first embodiment, and duplicated descriptions will be omitted. Further, a hardware structure of an information processing apparatus according to the sixth embodiment is, for example, similar to that of the first embodiment. Therefore, descriptions of the hardware structure will be also omitted.

However, overall processing in the sixth embodiment is different from that of the first embodiment. In the following, substantially the same processes and structures will be given the same reference numerals, and descriptions will be omitted.

<Example of Sixth Overall Processing>

Figure 26:
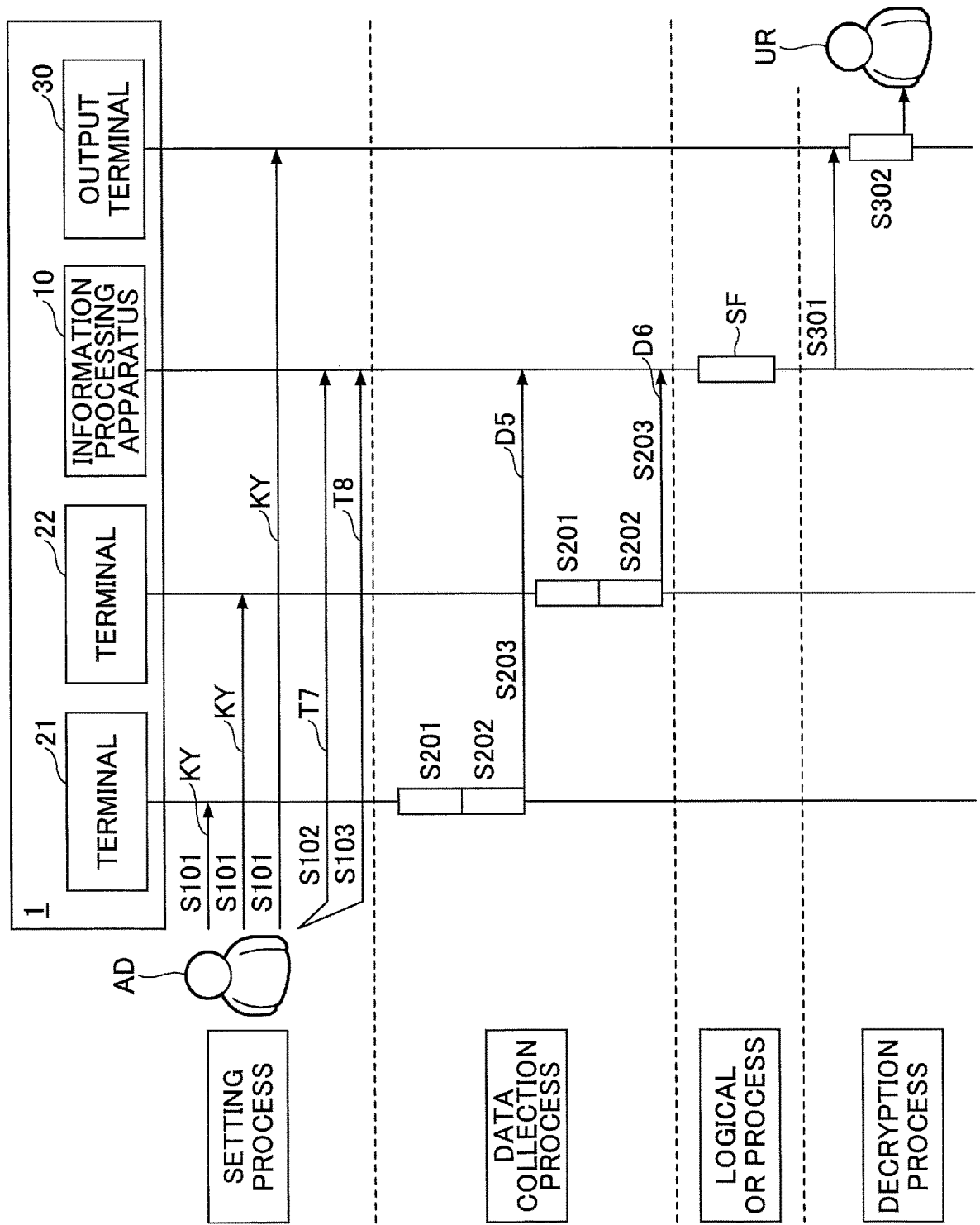
FIG. 26 is a sequence diagram illustrating an example of sixth overall processing by the information processing system.

FIG. 26 is a sequence diagram illustrating an example of sixth overall processing by an information processing system according to the sixth embodiment. The sixth overall processing is different from the first overall processing in that the addition process (step SA) is replaced with a logical OR process (step SF). With respect to the above, the setting process, the data collection process, and the decryption process are similar to those of the first overall processing. However, the constants and the tables used in the setting process are different from those used in the first overall processing through the fourth overall processing. The constants and the tables will be described in detail later.

<Example of Logical OR Process> (Step SF)

In step SF, the information processing apparatus 10 performs a logical OR process. In the following, similar to the fifth embodiment, an example will be described in which the processing targets are fifth data D5 and sixth data D6 that are the encrypted text data items transmitted from the terminals 20. For example, the logical OR process is a process equivalent to formula (12) illustrated in FIG. 27.

FIG. 27 is a formula illustrating a calculation equivalent to a logical OR process by an information processing apparatus according to an embodiment of the present invention. It should be noted that the tables, the variables, and the operators in formula (12) are the same as in formula (10).

Further, in formula (12) and in the following descriptions, "|" is an operator indicating a logical OR, or what is termed as "OR" operation.

For example, the information processing apparatus 10 realizes the formula (12) illustrated in the figure as follows.

Figure 28:
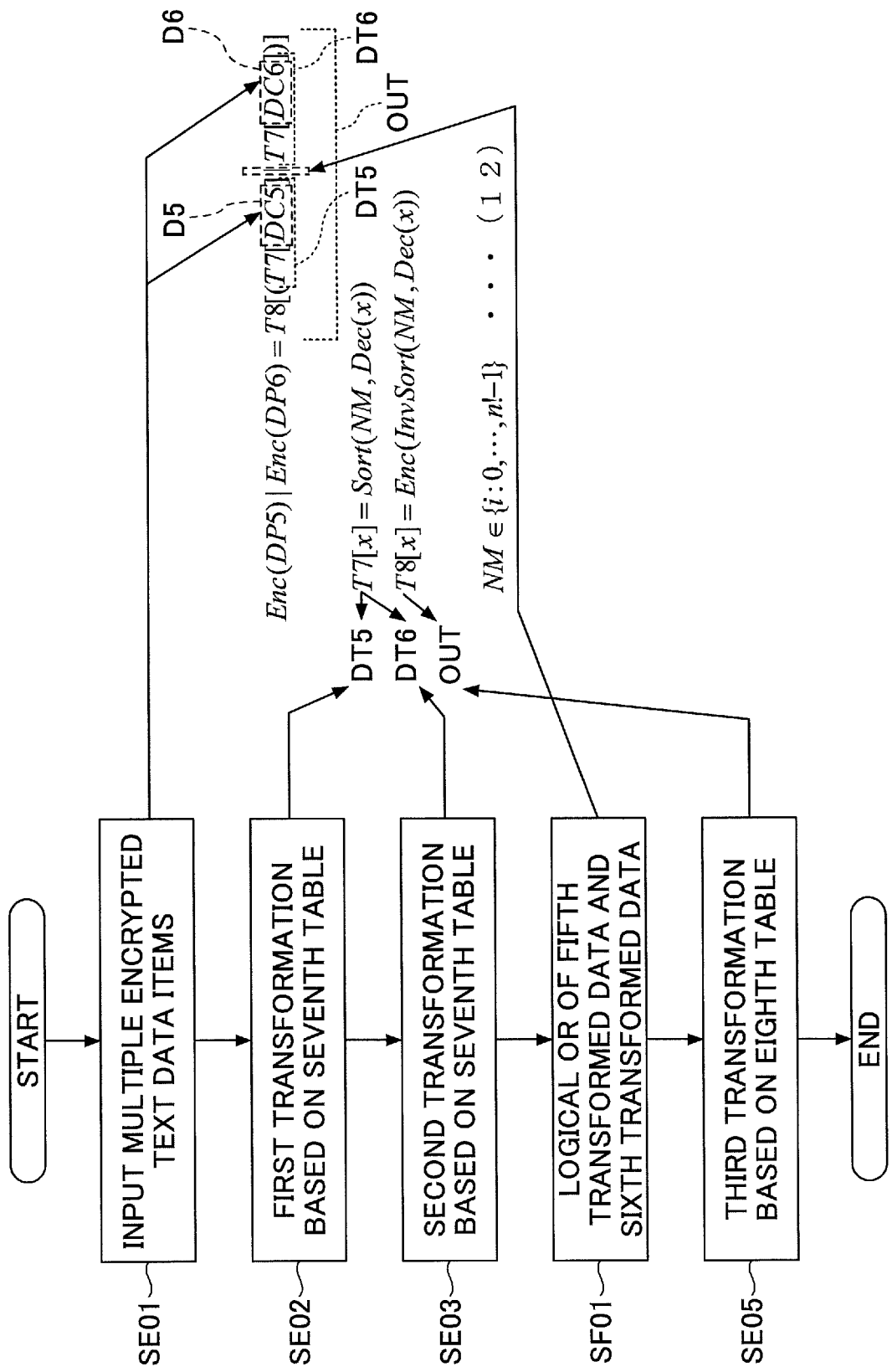
FIG. 28 is a flowchart illustrating an example of the logical OR process by the information processing apparatus.

FIG. 28 is a flowchart illustrating an example of the logical OR process by an information processing apparatus according to an embodiment of the present invention. The logical OR process is different from the logical AND process in that step SE04 is replaced with step SF01. In the following, the different point will be mainly described.

<Calculation Example of Logical OR of the Fifth Transformed Data and the Sixth Transformed Data> (Step SF01)

In step SF01, the information processing apparatus 10 calculates logical OR of the fifth transformed data and the sixth transformed data. In other words, in step SF01, the information processing apparatus 10 calculates logical OR of a transformed result according to step SE02 and a transformed result according to step SE03. Further, the transformed result according to the eighth table T8 is an output result OUT of the logical OR process.

When the logical OR process is performed as described above, an output result, equivalent to a result of calculating the logical OR of the fifth plain text data and the sixth plain text data that are data items before encryption, is obtained. In the following, the proof will be described.

(Proof)

FIG. 29 is a formula for proving the equivalence of the logical OR process by an information processing apparatus according to an embodiment of the present invention. For example, the equivalence can be proved according to formula (13) illustrated in FIG. 29.

As is proved by formula (13), an output result, obtained by applying a logical OR process illustrated in FIG. 28 to the encrypted data of the fifth plain text data "DP5" and the encrypted data of the sixth plain text data "DP6", is equivalent to "Enc (DP5□DP6)" in which the logical OR of the fifth plain text data "DP5" and the sixth plain text data "DP6" is calculated in a plain text state, and the calculated result is encrypted.

The above-described logical OR process is performed in advance before the decryption process. When the decryption process is performed similar to the first overall processing in the subsequent process, it is possible for the user UE to refer to the plain text data.

In this way, it is possible for the user UR to know the calculation result of the logical OR of the data items generated by the terminal 21 and the terminal 22 by referring to the plain text data.

It should be noted that the information processing apparatus 10 may further calculate the negation (NOT) of the output result OUT. In this way, it is possible for the information processing apparatus 10 to obtain a calculation result of logical NOR.

<Example of Functional Structure of Information Processing Apparatus According to the Fifth Embodiment and the Sixth Embodiment>

Figure 30:
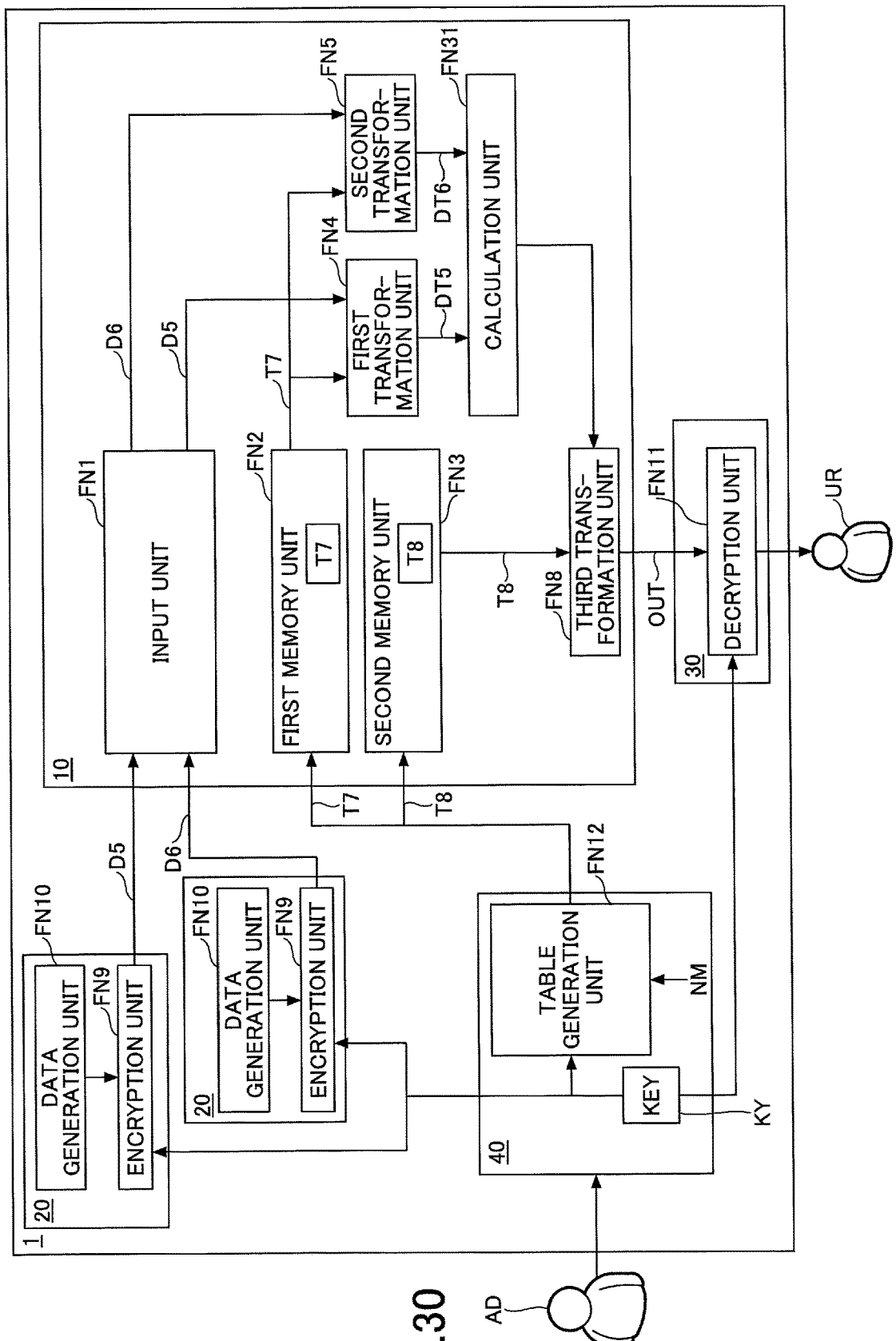
FIG. 30 is a functional block diagram illustrating a functional structure example of an information processing apparatus according to a fifth embodiment and a sixth embodiment of the present invention.

FIG. 30 is a functional block diagram illustrating an example of a functional structure of an information processing apparatus 10 according to the fifth embodiment and the sixth embodiment. For example, the information processing apparatus 10 has a functional structure including an input unit FN1, a first memory unit FN2, a second memory unit FN3, a first transformation unit FN4, a second transformation unit FN5, a calculation unit FN31, and a third transformation unit FN8. The functional structure illustrated in FIG. 30 is different from the functional structure illustrated in FIG. 21 in that the remainder operation unit FN7 and multiplication unit FN21 are removed and the calculation unit FN31 is added. With respect to the above, the terminals 20, the output terminal 30, the management apparatus 40, etc., are the same as those in FIG. 21, and thus, descriptions will be omitted.

The input unit FN1 performs an input procedure in which the fifth data D5 and the sixth data D6 are input. For example, the input unit FN1 is realized by the interface HW3 (refer to FIG. 2), or the like.

The first memory unit FN2 stores the seventh table T7 according to a first memory procedure. For example, the first memory unit FN2 is realized by the memory apparatus HW2 (refer to FIG. 2), or the like.

The second memory unit FN3 stores the eighth table T8 according to a second memory procedure. For example, the second memory unit FN3 is realized by the memory apparatus HW2 (refer to FIG. 3), or the like.

The first transformation unit FN4 performs a first transformation procedure in which the fifth data D5 is transformed into the fifth transformed data DT5 based on the seventh table T7. For example, the first transformation unit FN4 is realized by the CPU HW1 (refer to FIG. 2), or the like.

The second transformation unit FN5 performs a second transformation procedure in which the sixth data D6 is transformed into the sixth transformed data DT6 based on the seventh table T7. For example, the second transformation unit FN5 is realized by the CPU HW1 (refer to FIG. 2), or the like.

The calculation unit FN31 performs a calculation procedure in which: a logical AND and/or a logical OR of the third of the fifth transformed data DT5 and the sixth transformed data DT6 are calculated; and the calculated result is output to the third transformation unit FN8. For example, the calculation unit FN31 is realized by the CPU HW1 (refer to FIG. 2), or the like.

The third transformation unit FN8 performs a third transformation procedure in which an output result OUT, obtained by transforming the calculated result by the calculation unit FN31 based on the eighth table T8, is transmitted to the output terminal 30. For example, the third transformation unit FN8 is realized by the CPU HW1 (refer to FIG. 3), or the like.

As illustrated in the figure, a common key KY is transmitted to each of the terminals 20 and the output terminal 30. When the key KY is transmitted as described above, it is possible for the terminals 20 to encrypt data to be transmitted based on the key KY. With respect to the above, it is possible for the output terminal 30 to decrypt the output result OUT according to the key KY.

First, based on an operation by the administrator AD, the management apparatus 40 generates a key KY. Further, based on an operation by the administrator AD, the management apparatus 40 generates encryption parameters including the rearrangement number NM, etc. When the key KY, the rearrangement number NM is defined as described above, the management apparatus 40 generates the seventh table T7 and the eighth table T8 by using the table generation unit FN12. For example, the table generation unit FN12 is realized by an operation apparatus, or the like, included in the management apparatus 40.

The key KY, generated as described above, is transmitted to each of the terminals 20 and the output terminal 30 according to the setting process illustrated in FIG. 22 and FIG. 26. Similarly, the seventh table T7 and the eighth table T8 generated based on the rearrangement number NM are transmitted to the information processing apparatus 10 according to the setting process illustrated in FIG. 22 and FIG. 26.

Further, each of the terminals 20 generates plain text data according to the data generation unit FN10. For example, in the case where the data is a measurement result, the data generation unit FN10 generates the data when measurement is performed by a sensor included in the terminal 20.

Next, each of the terminals 20 encrypts the plain text data generated by the data generation unit FN10 according to the encryption unit FN9. For example, the encryption unit FN9 and the data generation unit FN10 are realized by an operation apparatus, or the like, included in each of the terminals 20. In this way, the encrypted text data is generated by each of the terminals 20. The encrypted text data items of the fifth data D5, the sixth data D6, etc., generated as described above, are collected by the information processing apparatus 10. For example, the data collection process illustrated in FIG. 22 and FIG. 26 is realized by the input unit FN1, the encryption unit FN9, the data generation unit FN10, etc.

As illustrated in the figure, the logical AND process illustrated in FIG. 22 can be realized by the information processing apparatus 10 when the first transformation by the first transformation unit FN4, the second transformation by the second transformation unit FN5, the calculation of the logical AND by the calculation unit FN31, and the third transformation by the third transformation unit FN8, are performed. Further, the logical AND process is, for example, a process illustrated in FIG. 24.

In this way, as proved according to formula (11) (refer to FIG. 25), it is possible for the information processing apparatus 10 to obtain data equivalent to what is obtained by calculating the logical AND of the plain text data items and by encrypting the calculated result. In other words, even when the data is in an encrypted state, it is possible for the information processing apparatus 10 to calculate the logical AND of a plurality of the data items.

As illustrated in the figure, the logical OR process illustrated in FIG. 26 can be realized by the information processing apparatus 10 when the first transformation by the first transformation unit FN4, the second transformation by the second transformation unit FN5, the calculation of the logical OR by the calculation unit FN31, and the third transformation by the third transformation unit FN8, are performed. Further, the logical OR process is, for example, a process illustrated in FIG. 26. In this way, as proved according to formula (13) (refer to FIG. 29), it is possible for the information processing apparatus 10 to obtain data equivalent to what is obtained by calculating the logical OR of the plain text data items and by encrypting the calculated result. In other words, even when the data is in an encrypted state, it is possible for the information processing apparatus 10 to calculate the logical OR of a plurality of the data items.

Further, it is preferable that the information processing apparatus 10 perform both of the logical AND process illustrated in FIG. 22 and the logical OR process illustrated in FIG. 26. In other words, it is possible for the information processing apparatus 10 to output to the output terminal 30 both of the encrypted text data items equivalent to the calculated result of the logical OR of the data items generated by the terminals 20 and to the calculated result of the logical AND of the data items generated by the terminals 20. As described above, in the case where the information processing apparatus 10 performs both of the logical AND process and the logical OR process, it is preferable that the information processing apparatus 10 store each of the tables as illustrated in the figure.

Specifically, it is preferable that the information processing apparatus 10 use a common seventh table T7 and a common eighth table T8 in the logical AND process and the logical OR process as illustrated in the figure. In other words, as illustrated in the figure, even in the case where the information processing apparatus 10 performs both of the logical AND process and the logical OR process, a single seventh table T7 is stored by the first memory unit FN2. Similarly, even in the case where the information processing apparatus 10 performs both of the logical AND process and the logical OR process, a single eighth table T8 is stored by the second memory unit FN3. Therefore, the first transformation unit FN4 uses the same seventh table T7 and the same eighth table T8 in case of performing the logical AND process and in case of performing the logical OR process.

Further, the calculation unit FN31 switches between calculating the logical AND or calculating the logical OR depending on whether performing the logical AND process or performing the logical OR process.

According to the arrangement described above, because the seventh table T7 and the eighth table T8 are used in common, it is possible for the information processing apparatus 10 to make a memory area, used for storing the seventh table T7 and the eighth table T8, smaller.

Seventh Embodiment

The seventh embodiment may be realized by, for example, an overall structure similar to that of the first embodiment. Therefore, it is assumed that the overall structure of the seventh embodiment is similar to that of the first embodiment, and duplicated descriptions will be omitted. Further, a hardware structure of an information processing apparatus according to the seventh embodiment is, for example, similar to that of the first embodiment. Therefore, descriptions of the hardware structure will be also omitted.

However, overall processing in the seventh embodiment is different from that of the first embodiment. In the following, substantially the same processes and structures will be given the same reference numerals, and descriptions will be omitted.

<Example of Seventh Overall Processing>

Figure 31:
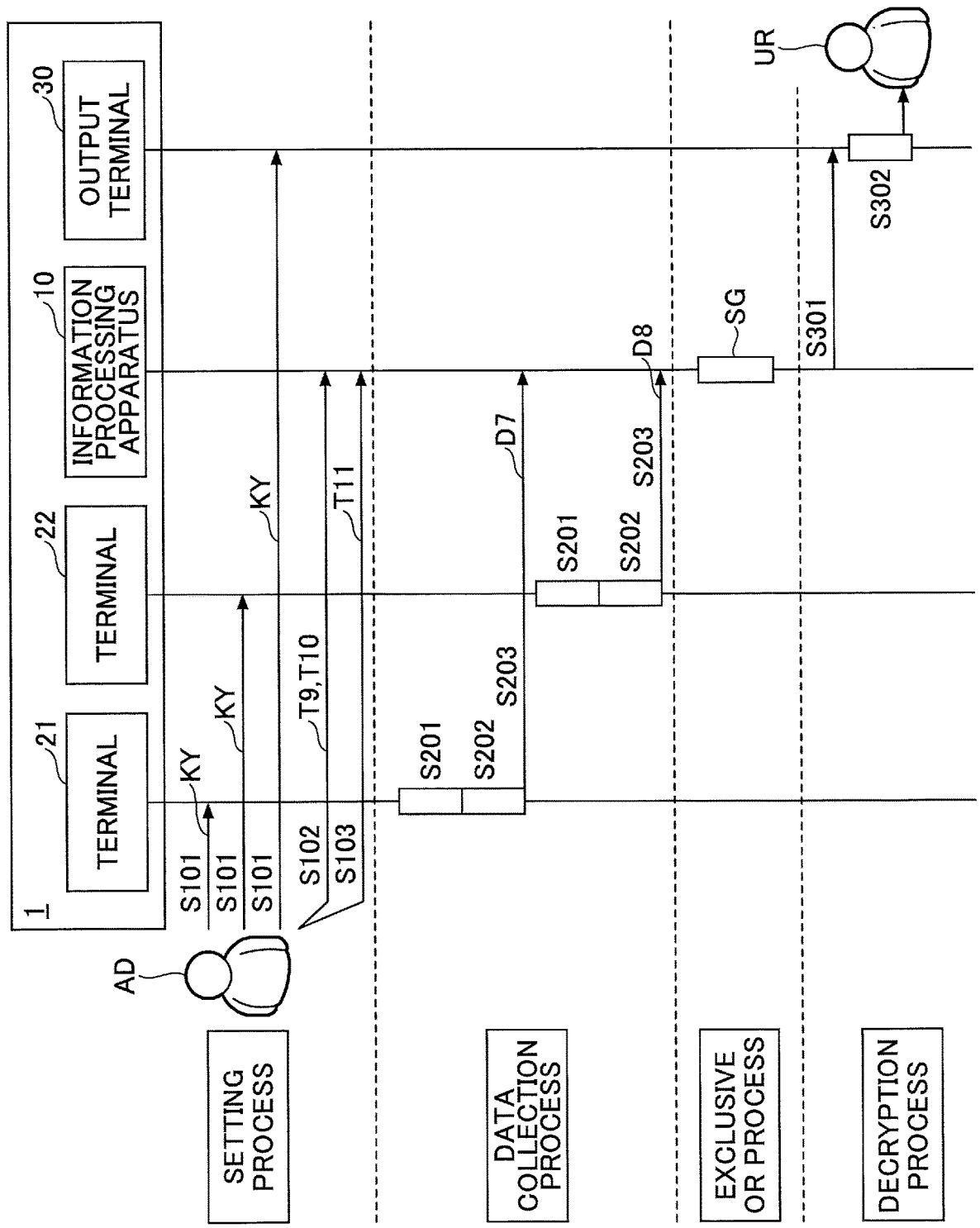
FIG. 31 is a sequence diagram illustrating an example of seventh overall processing by the information processing system.

FIG. 31 is a sequence diagram illustrating an example of seventh overall processing by an information processing system according to the seventh embodiment. The seventh overall processing is different from the first overall processing in that the addition process (step SA) is replaced with an exclusive OR process (step SG). With respect to the above, the setting process, the data collection process, and the decryption process are similar to those of the first overall processing. However, the constants and the tables used in the setting process are different from those used in the first overall processing through the fourth overall processing. The constants and the tables will be described in detail later.

<Example of Exclusive OR Process> (Step SG)

In step SG, the information processing apparatus 10 performs an exclusive OR process. In the following, an example will be described in which the processing targets are seventh data D7 and eighth data D8 that are the encrypted text data items transmitted from the terminals 20. For example, the exclusive OR process is a process equivalent to formula (14) illustrated in FIG. 32.

It should be noted that "Enc" and "Dec" in formula (14) mean the same things as those in formula (1). Further, "T" means the similar table as in formula (1). Further, similar to those in formula (1), "DP" and "DC" in formula (10) indicate plain text data and encrypted text data, respectively. Further, "Sort(NM, x)" and "InvSort(NM, x)" indicates the rearrangement function and the inverse function, respectively, the same as in formula (11), Furthermore, "NM" is the rearrangement number, the same as in formula (11).

In formula (14), the sixth constant "C6" and the seventh constant "C7" are random numbers, or the like, generated by performing a random number generation function, or the like, Further, the same as in formula (1), the sixth constant "C6" and the seventh constant "C7" are any number selected from "0" through "N−1".

Further, in formula (14) and in the following descriptions, "^" is an operator indicating an exclusive OR, or what is termed as "XOR" operation.

For example, the information processing apparatus 10 realizes the formula (14) illustrated in the figure as follows.

Figure 33:
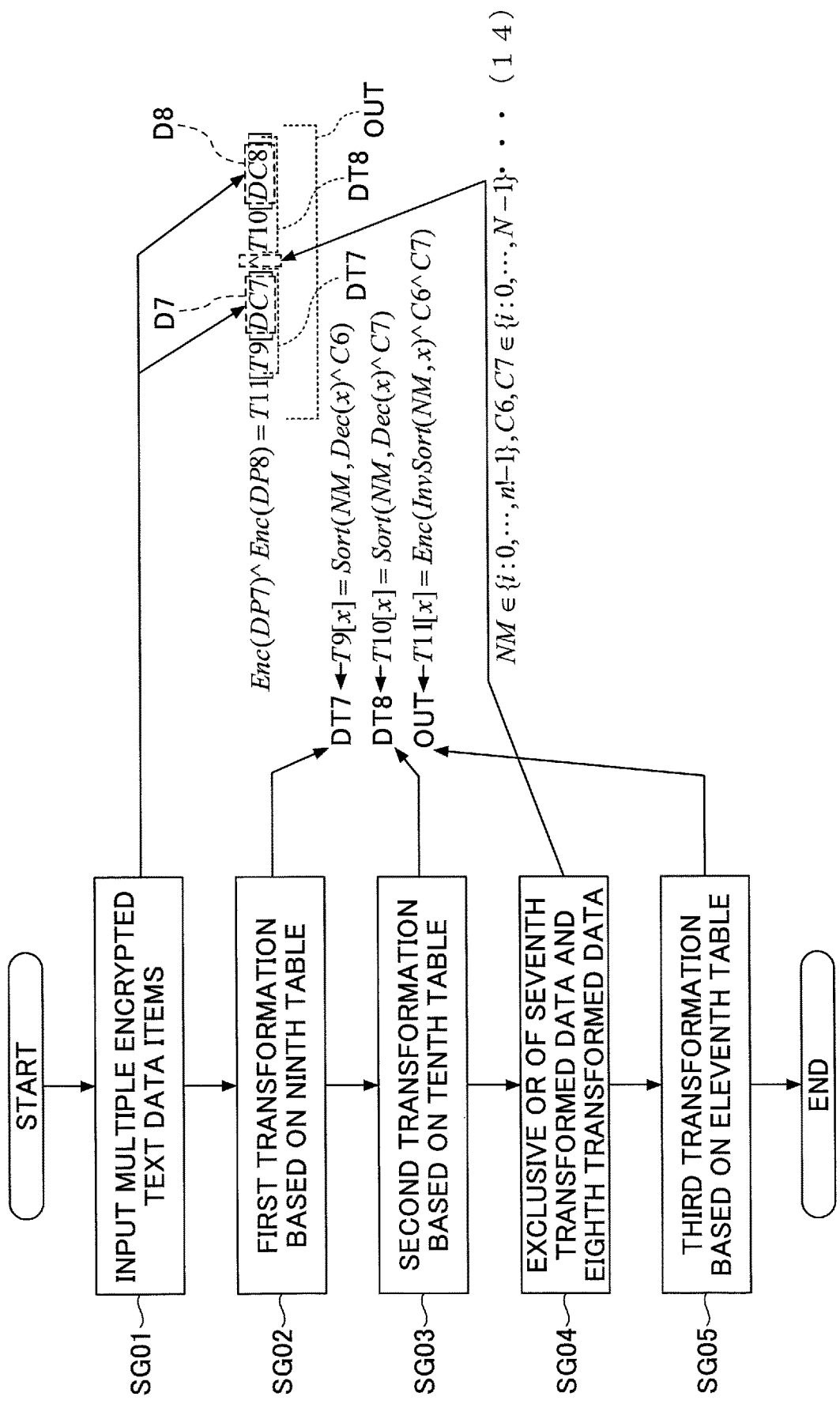
FIG. 33 is a flowchart illustrating an example of the exclusive OR process by the information processing apparatus.

FIG. 33 is a flowchart illustrating an example of the exclusive OR process by an information processing apparatus according to an embodiment of the present invention.

<Input Example of a Plurality of Encrypted Text Data Items> (Step SG01)

In step SG01, the information processing apparatus 10 inputs a plurality of encrypted text data items. For example, when encrypted text data items, the seventh data D7 and the eighth data D8, transmitted in step S203 are received, it is possible for the information processing apparatus 10 to input the encrypted text data items. The encrypted text data items that have been input as described above are "DC7" and "DC8" in formula (14).

<Example of First Transformation Based on Ninth Table> (Step SG02)

In step SG02, the information processing apparatus 10 transforms the seventh data based on the ninth table. As illustrated in the figure, the information processing apparatus 10 transforms the seventh data D7, which is one of the encrypted text data items input in step SG01, by using the ninth table T9.

Further, as illustrated in formula (14), the ninth table T9 is a table used for performing a transformation equivalent to a calculation in which the data, obtained by decrypting the seventh data D7 as a transformation target, that is, the plain text data of the seventh data D7, is rearranged according to the rearrangement function. It should be noted that which rearrangement pattern is to be applied is defined by the rearrangement number NM. Hereinafter, the data, indicating a result of transformation in which the seventh data D7 is transformed according to the ninth table T9, is referred to as "seventh transformed data DT7".

<Example of Second Transformation Based on Tenth Table> (Step SG03)

In step SG03, the information processing apparatus 10 transforms the eighth data based on the tenth table. As illustrated in the figure, the information processing apparatus 10 transforms the eighth data D8, which is another encrypted text data item, of the encrypted text data items input in step SG01, different from the data used in step SG02, that is, the seventh data D7, by using the tenth table T10.

Further, as illustrated in formula (14), the tenth table T10 is a table used for performing a transformation equivalent to a calculation in which the data, obtained by decrypting the eighth data D8 as a transformation target, that is, the plain text data of the eighth data D8, is rearranged according to the rearrangement function. Hereinafter, the data, indicating a result of transformation in which the eighth data D8 is transformed according to the tenth table T10, is referred to as "eighth transformed data DT8".

<Calculation Example of Exclusive OR of the Seventh Transformed Data and the Eighth Transformed Data> (Step SG04)

In step SG04, the information processing apparatus 10 calculates an exclusive OR of the seventh transformed data and the eighth transformed data. In other words, in step SG04, the information processing apparatus 10 calculates an exclusive OR of a transformed result according to step SG02 and a transformed result according to step SG03.

<Example of Third Transformation Based on Eleventh Table> (Step SG05)

In step SG05, the information processing apparatus 10 transforms data based on the eleventh table. As illustrated in the figure, the transformation target is the data indicating a result of the exclusive OR according to step SG04.

Further, as illustrated in formula (14), the eleventh table T11 is a table used for performing a transformation equivalent to a calculation in which the data, obtained by decrypting the transformation target data, that is, the plain text data of the data indicating a result of the exclusive OR, is rearranged according to the inverse function of the rearrangement function. Further, the transformed result according to the eleventh table T11 is an output result OUT of the exclusive OR process.

When the exclusive OR process is performed as described above, an output result, equivalent to a result of calculating the exclusive OR of the seventh plain text data and the eighth plain text data that are data items before encryption, is obtained. In the following, the proof will be described.

(Proof)

FIG. 34 is a formula for proving the equivalence of the exclusive OR process by an information processing apparatus according to an embodiment of the present invention. For example, the equivalence can be proved according to formula (15) illustrated in FIG. 34. It should be noted that the calculation of the exclusive OR has characteristics including "x=x^A^A".

As is proved by formula (15), an output result, obtained by applying an exclusive process illustrated in FIG. 31 to the encrypted data of the seventh plain text data "DP7" and the encrypted data of the eighth plain text data "DP8", is equivalent to "Enc (DP7^DP8)" in which the exclusive OR of the seventh plain text data "DP7" and the eighth plain text data "DP8" is calculated in a plain text state, and the calculated result is encrypted.

The above-described exclusive OR process is performed in advance before the decryption process. When the decryption process is performed similar to the first overall processing in the subsequent process, it is possible for the user UE to refer to the plain text data.

In this way, it is possible for the user UR to know the calculation result of the exclusive OR of the data items generated by the terminal 21 and the terminal 22 by referring to the plain text data.

<Example of Functional Structure of Information Processing Apparatus According to Seventh Embodiment>

Figure 35:
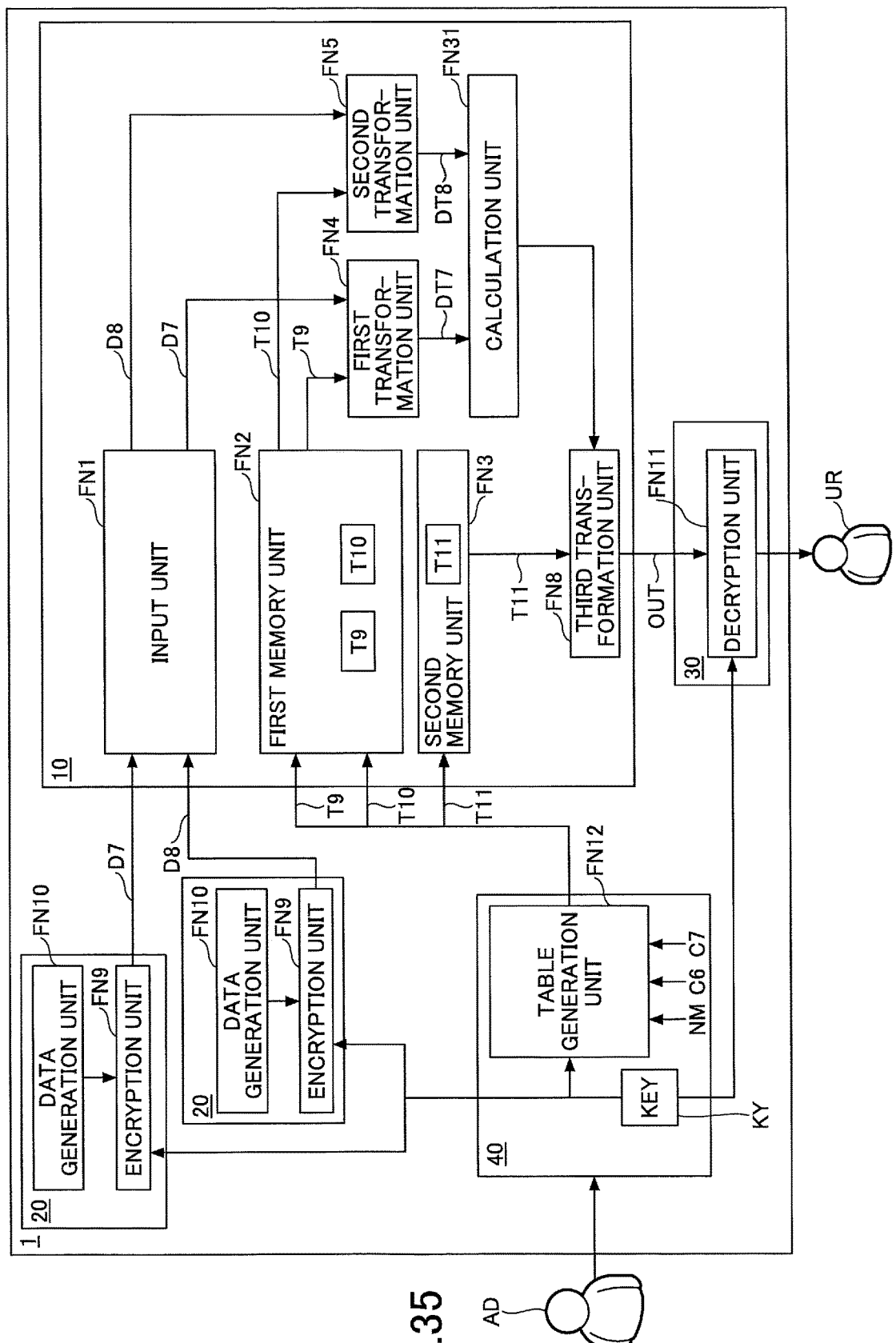
FIG. 35 is a functional block diagram illustrating a functional structure example of an information processing apparatus according to a seventh embodiment of the present invention.

FIG. 35 is a functional block diagram illustrating a functional structure example of an information processing apparatus according to a seventh embodiment of the present invention. For example, the information processing apparatus 10 has a functional structure including an input unit FN1, a first memory unit FN2, a second memory unit FN3, a first transformation unit FN4, a second transformation unit FN5, a calculation unit FN31, and a third transformation unit FN8. With respect to the above, the terminals 20, the output terminal 30, the management apparatus 40, etc., are the same as those in FIG. 21, and thus, descriptions will be omitted.

The input unit FN1 performs an input procedure in which the seventh data D7 and the eighth data D8 are input. For example, the input unit FN1 is realized by the interface HW3 (refer to FIG. 2), or the like.

The first memory unit FN2 stores the ninth table T9 and the tenth table T10 according to a first memory procedure. For example, the first memory unit FN2 is realized by the memory apparatus HW2 (refer to FIG. 2), or the like.

The second memory unit FN3 stores the eleventh table T11 according to a second memory procedure. For example, the second memory unit FN3 is realized by the memory apparatus HW2 (refer to FIG. 3), or the like.

The first transformation unit FN4 performs a first transformation procedure in which the seventh data D7 is transformed into the seventh transformed data DT7 based on the ninth table T9. For example, the first transformation unit FN4 is realized by the CPU HW1 (refer to FIG. 2), or the like.

The second transformation unit FN5 performs a second transformation procedure in which the eighth data D8 is transformed into the eighth transformed data DT8 based on the tenth table T10. For example, the second transformation unit FN5 is realized by the CPU HW1 (refer to FIG. 2), or the like.

The calculation unit FN31 performs a calculation procedure in which: an exclusive OR of the seventh transformed data DT7 and the eighth transformed data DT8 are calculated; and the calculated result is output to the third transformation unit FN8. For example, the calculation unit FN31 is realized by the CPU HW1 (refer to FIG. 2), or the like.

The third transformation unit FN8 performs a third transformation procedure in which an output result OUT, obtained by transforming the calculated result by the calculation unit FN31 based on the eleventh table T11, is transmitted to the output terminal 30. For example, the third transformation unit FN8 is realized by the CPU HW1 (refer to FIG. 3), or the like.

As illustrated in the figure, a common key KY is transmitted to each of the terminals 20 and the output terminal 30. When the key KY is transmitted as described above, it is possible for the terminals 20 to encrypt data to be transmitted based on the key KY. With respect to the above, it is possible for the output terminal 30 to decrypt the output result OUT according to the key KY.

First, based on an operation by the administrator AD, the management apparatus 40 generates a key KY. Further, based on an operation by the administrator AD, the management apparatus 40 generates encryption parameters including the rearrangement number NM, the sixth constant "C6", the seventh constant "C7", etc. When the rearrangement number NM, the sixth constant "C6", and the seventh constant "C7" are defined as described above, the management apparatus 40 generates the ninth table T9, the tenth table T10, and the eleventh table T11 by using the table generation unit FN12. For example, the table generation unit FN12 is realized by an operation apparatus, or the like, included in the management apparatus 40.

The key KY, generated as described above, is transmitted to each of the terminals 20 and the output terminal 30 according to the setting process illustrated in FIG. 31. Similarly, the ninth table T9, the tenth table T10, and the eleventh table T11 generated based on the rearrangement number NM, the sixth constant "C6", and the seventh constant "C7" are transmitted to the information processing apparatus 10 according to the setting process illustrated in FIG. 31.

Further, each of the terminals 20 generates plain text data according to the data generation unit FN10. For example, in the case where the data is a measurement result, the data generation unit FN10 generates the data when measurement is performed by a sensor included in the terminal 20.

Next, each of the terminals 20 encrypts the plain text data generated by the data generation unit FN10 according to the encryption unit FN9. For example, the encryption unit FN9 and the data generation unit FN10 are realized by an operation apparatus, or the like, included in each of the terminals 20. In this way, the encrypted text data is generated by each of the terminals 20. The encrypted text data items of the seventh data D7, the eighth data D8, etc., generated as described above, are collected by the information processing apparatus 10. For example, the data collection process illustrated in FIG. 31 is realized by the input unit FN1, the encryption unit FN9, the data generation unit FN10, etc.

As illustrated in the figure, the exclusive OR process illustrated in FIG. 31 can be realized by the information processing apparatus 10 when the first transformation by the first transformation unit FN4, the second transformation by the second transformation unit FN5, the calculation of the exclusive OR by the calculation unit FN31, and the third transformation by the third transformation unit FN8, are performed. Further, the exclusive OR process is, for example, a process illustrated in FIG. 33. In this way, as proved according to formula (15) (refer to FIG. 34), it is possible for the information processing apparatus 10 to obtain data equivalent to what is obtained by calculating the exclusive OR of the plain text data items and by encrypting the calculated result. In other words, even when the data is in an encrypted state, it is possible for the information processing apparatus 10 to calculate the exclusive OR of a plurality of the data items.

<<Example of Effect>>

Figure 36:
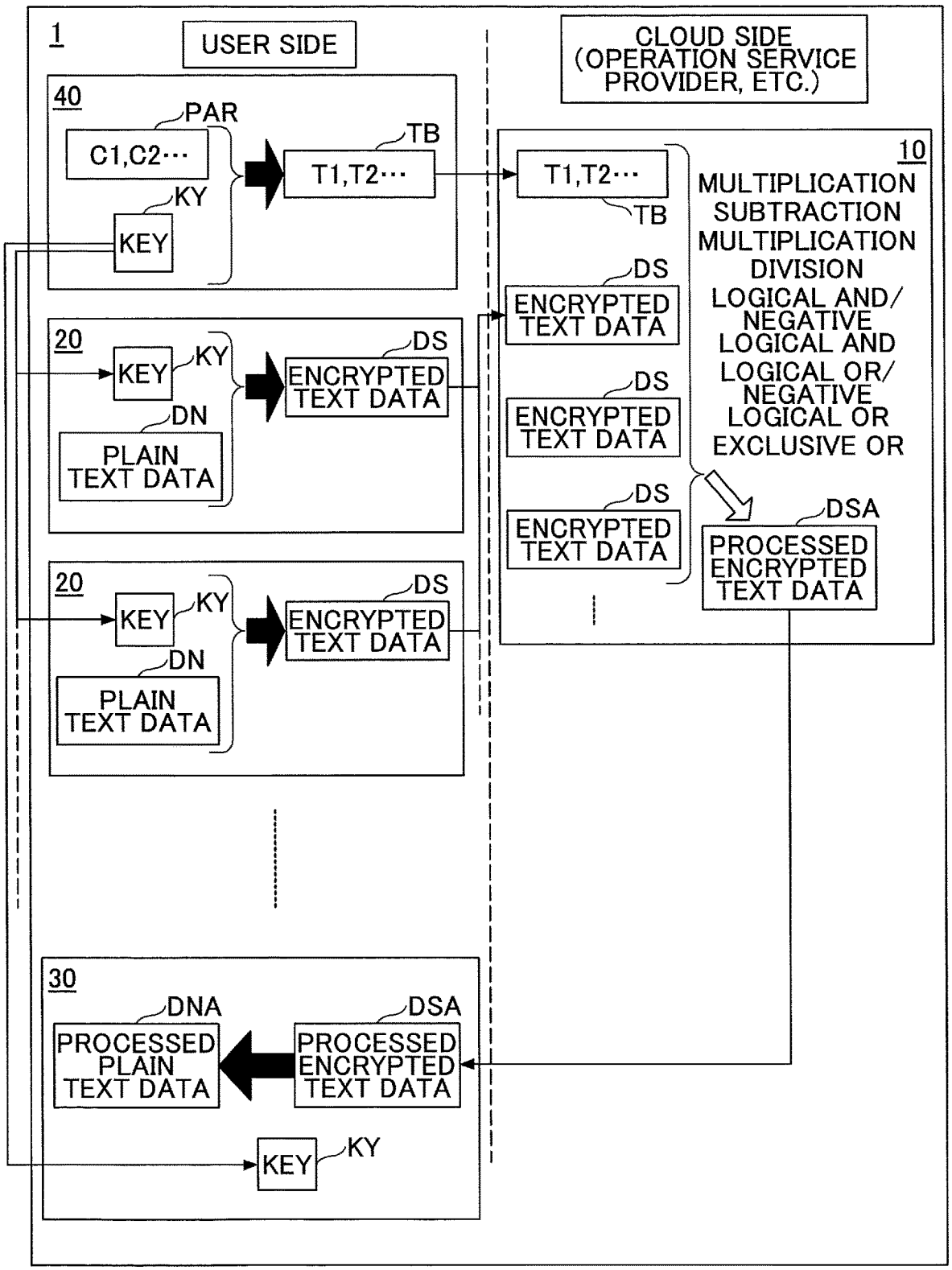
FIG. 36 is a block diagram illustrating an example of an effect of each overall processing performed by the information processing apparatus.

FIG. 36 is a block diagram illustrating an example of an effect of each overall processing performed by the information processing apparatus. First, in the information processing system 1, encryption parameters PAR including a key KY and each of the constants by the management apparatus 40 in a secure state. When there are the key KY and the encryption parameters PAR as described above, it is possible for the management apparatus 40 to generate a table TB. Further, the generated table TB is provided to the information processing apparatus 10.

With respect to the above, the key KY is set at each of the terminals 20. Further, each of the terminals 20 encrypts plain text data DN generated by the terminal 20 according to measurement, etc., and generates encrypted text data DS. According to the operations described above, the plain text data DN is in an encrypted state. Therefore, even on the Internet, or the like, there is little risk of information leakage, etc., when it is in an encrypted text data DS state. Next, each of the terminals 20 transmits its encrypted text data DS to the information processing apparatus 10. According to the operations described above, encrypted text data items DS as targets of statistical processing, or the like, are collected by the information processing apparatus 10.

It is possible for the information processing apparatus 10 to provide various calculation services on the network. Specifically, the information processing apparatus 10 is a server that provides what is termed as "cloud services", or the like. Further, the services include four arithmetic operations such as, for example, addition, subtraction, multiplication, division, or a combination thereof, etc. Further, the services include logical operations such as logical AND, logical OR, negative logical AND, negative logical OR, exclusive OR, negation, or a combination thereof, etc.

When the information processing apparatus 10 performs four arithmetic operations, logical operations, etc., as described above, it is possible for the user UR to obtain a statistical calculation result of a plurality of data items, etc.

In this forms of services, the information processing apparatus 10 may handle various data items. In other words, the information processing apparatus 10 may provide services to a plurality of users.

For example, in the case where the information processing apparatus 10 is used by a plurality of users, if a data item handled by the information processing apparatus 10 is a plain text data item, then the risk of information leakage is high in a case where the data becomes open to other users, etc., due to an accident, a security hole, etc. Therefore, it is preferable that each of the data items be processed in an encrypted state on the side of the information processing apparatus 10, or on the cloud side.

According to an information processing apparatus 10 described in each of the embodiments, when the table TB is input, each of the processes can be performed in a state where each of the data items is in an encrypted state, that is, in an encrypted text data DS state. According to the operations described above, it is possible for the information processing apparatus 10 to apply four arithmetic operations and logical operations to a plurality of encrypted text data items DS, and then, generate after-process encrypted text data DSA.

Next, the output terminal 30 downloads the after-process encrypted text data DSA from the information processing apparatus 10. Further, the output terminal 30 decrypts the after-process encrypted text data DSA based on the key KY that has been set in advance, and obtains after-process plain text data DNA.

The after-process plain text data DNA is data indicating a result equivalent to a result of applying four arithmetic operations and logical operations to the plurality of plain text data items DN. Therefore, it is possible for the user UR to know the result of applying statistical processes to the plurality of plain text data items DN by referring to the after-process plain text data DNA.

Further, according to an embodiment described above, each of the data items can be encrypted by using an encryption algorithm recommended in the AES method, or the like. In an IoT (Internet of Things) environment, or the like, an encryption based on a proprietary method, RSA (Rivest Shamir Adleman) method, or a homomorphic encryption algorithm, has a higher risk of having the key broken (revealed) or having the algorithm broken (revealed), and thus, the security may not be sufficient.

Further, a RSA method, or the like, may require the terminals to have greater resources for executing the encryption algorithm. As a result, in the IoT environment, or the like, when the terminals are what is termed as embedded devices, or the like, the terminals may need to add resources. Therefore, when the RSA method, or the like, is used, there may be a case of increased cost due to the resource addition, etc.

With respect to the above, according to an embodiment of the present invention, it is possible to use AES method, or the like. In other words, according to an embodiment of the present invention, it is possible for the information processing apparatus to perform processing of four arithmetic operations, logical operations, etc., without depending on the encryption method, etc. Therefore, it is possible to use an encryption algorithm and a decryption algorithm flexibly in accordance with the resources and the specifications of the terminals that execute the encryption algorithm.

<<With Respect to Tables>>

The data amount of each of the tables will be, for example, as follows.

FIG. 37 is a table illustrating table size examples according to an embodiment of the present invention. As illustrated in the figure, the data amount of each of the tables is defined based on the bit length of the process target data, that is, the number of bits of the plain text data. Specifically, as illustrated in the figure, the data amount of the table is "2n×n/8" (byte). More specifically, in the case where the process target data items are "8 bits", "16 bits", "24 bits", and "32 bits", the data amounts of table are, as illustrated in the figure, "256 bytes", "128K bytes", "48M bytes", and "16G bytes", respectively.

Therefore, as described above, it is preferable that the tables be used in common in the information processing apparatus that performs addition, subtraction, multiplication, division, logical AND, and logical OR. When the tables are used in common as described above, it is possible for the information processing apparatus to reduce the data amount illustrated in the figure.

FIG. 38 is a table illustrating a degree of difficulty of decryption for each process type according to an embodiment of the present invention. The values of the degrees of difficulty of decryption are as shown in the figure according to an embodiment of the present invention. In an embodiment of the present invention, there is a case in which candidates of the plain text data for the encrypted text data may be extracted when each of the constants included in the tables is identified. However, as illustrated in the figure, a calculation amount for searching for each of the constants from the tables, that is, the degree of difficulty of decryption is always equal to or more than n bits. Therefore, the degree of difficulty of decryption for searching for the constant is higher than that for searching the pair of the plain text data and the encrypted text data. Further, even if the candidates of the plain text data for the encrypted text data are extracted, the extraction may not lead to the searching for the key.

With respect to the above, for example, in the encryption according to a counter mode (SP800-38A) in the AES method, the key length, or the degree of encryption strength, will be 128 bits through 256 bits. However, the searchable range is 32 bits of the plain text data or the encrypted text data.

Therefore, it is possible for an information processing apparatus according to an embodiment of the present invention to secure a high degree of difficulty of decryption. Therefore, it is possible for an information processing apparatus according to an embodiment of the present invention to improve data security.

Other Embodiment

The above-described embodiments may be combined.

Further, each of the processes may be realized by a program used for causing a computer of an information processing system, or the like, including one or more information processing apparatuses, to execute the information processing method. Further, the program may be distributed via a computer readable recording medium, or via a network. It should be noted that the recording medium is, for example, an optical disk, a flash memory, an auxiliary memory apparatus, etc.

Further, it is not necessary that the processes described above should be performed in the order illustrated in the figure. In other words, each of the processes may be performed at a timing different from the timing illustrated in the figure. Further, each of the processes may be performed by a plurality of apparatuses in a redundant manner, in a distributed manner, in a parallel manner, in a virtual manner, or in a manner of combination thereof.

Further, each of the apparatuses may be two or more apparatuses connected to each other via a network, etc.

As described above, preferable embodiments according to the present invention have been described. An embodiment according to the present invention is not limited to the above described embodiments. Various modifications and variations may be possible within the range of the subject matter of the present invention recited in the claims.

The present application is based on and claims the benefit of priority of Japanese Priority Application No. 2017-075041 filed on Apr. 5, 2017, the entire contents of which are hereby incorporated herein by reference.

What is claimed is:

1. An information processing apparatus that processes a plurality of encrypted text data items, the information processing apparatus comprising:
    an input unit configured to input first data and second data that are the encrypted text data items extracted from the plurality of encrypted text data items;
    a first memory unit configured to store a first table used for transforming the first data and a second table used for transforming the second data;
    a first transforming unit configured to transform the first data to first transformed data based on the first table;
    a second transforming unit configured to transform the second data to second transformed data based on the second table;
    an addition unit configured to calculate an addition result by adding the first transformed data and the second transformed data;
    a remainder calculation unit configured to obtain a remainder by dividing the addition result by an exponential number having a value of two as a base and having a number of bits of the encrypted text data items as an exponent, wherein each of the encrypted text data items has a same number of bits;
    a second memory unit configured to store a third table used for transforming the obtained remainder; and
    a third transforming unit configured to output an output result by transforming the obtained remainder based on the third table.

2. The information processing apparatus according to claim 1, wherein
    the output result is equivalent to a result of adding first plain text data and second plain text data, the first plain text data and the second plain text data being the encrypted text data items before encryption,
    the first table indicates the first transformed data that is a result obtained by adding a second constant to a multiplication result obtained by multiplying first plain text data, which has been obtained by decrypting the first data, by a first constant,
    the second table indicates the second transformed data that is a result obtained by adding a third constant, which is different from the second constant, to a multiplication result obtained by multiplying second plain text data, which has been obtained by decrypting the second data, by a first constant, and
    the third table indicates the output result that is a result obtained by dividing a subtraction result obtained by subtracting the second constant and the third constant from the remainder.

3. The information processing apparatus according to claim 1, wherein
    the output result is equivalent to a result obtained by subtracting second plain text data from first plain text data, the first plain text data and the second plain text data being the encrypted text data items before encryption,
    the first table indicates the first transformed data that is a result obtained by adding a second constant to a multiplication result obtained by multiplying first plain text data, which has been obtained by decrypting the first data, by a first constant,
    the second table indicates the second transformed data that is a result obtained by adding a third constant, which is different from the second constant, to a multiplication result obtained by multiplying second plain text data, which has been obtained by decrypting the second data, by a first constant, and by multiplying the multiplying result by minus one, and,
    the third table indicates the output result that is a result obtained by dividing a subtraction result obtained by subtracting the second constant and the third constant from the remainder.

4. The information processing apparatus according to claim 1, wherein
    the output result is equivalent to a result obtained by adding first plain text data and second plain text data, or equivalent to a result obtained by subtracting the second plain text data from the first plain text data, the first plain text data and the second plain text data being the encrypted text data items before encryption,
    the first table and the third table are commonly used, and
    the first memory unit stores a plurality of the second tables, the second tables being different from each other.

5. An information processing apparatus that processes a plurality of encrypted text data items, the information processing apparatus comprising:
    an input unit configured to input third data and fourth data that are the encrypted text data items extracted from the plurality of encrypted text data items;
    a first memory unit configured to store a fourth table used for transforming the third data and a fifth table used for transforming the fourth data respectively;
    a first transforming unit configured to transform the third data to third transformed data based on the fourth table;
    a second transforming unit configured to transform the fourth data to fourth transformed data based on the fifth table;
    a multiplication unit configured to calculate a multiplication result by multiplying the first transformed data by the second transformed data;
    a remainder calculation unit configured to obtain a remainder by dividing the multiplication result by an exponential number having a value of two as a base and having a number of bits of the encrypted text data items as an exponent, wherein each of the encrypted text data items has a same number of bits;
    a second memory unit configured to store a sixth table used for transforming the obtained remainder; and
    a third transforming unit configured to output an output result by transforming the obtained remainder based on the sixth table.

6. The information processing apparatus according to claim 5, wherein
    the output result is equivalent to a result obtained by multiplying third plain text data by fourth plain text data, the third plain text data and the fourth plain text data being the encrypted text data items before encryption, the fourth table indicates the third transformed data that is a result obtained by multiplying third plain text data, which has been obtained by decrypting the third data, by a fourth constant, the fifth table indicates the fourth transformed data that is a result obtained by multiplying fourth plain text data, which has been obtained by decrypting the fourth data, by a fifth constant that is different from the fourth constant, the sixth table indicates the output result that is a result obtained by dividing the remainder by the fourth constant and the fifth constant.

7. The information processing apparatus according to claim 5, wherein the output result is equivalent to a result obtained by dividing third plain text data by fourth plain text data, the third plain text data and the fourth plain text data being the encrypted text data items before encryption, the fourth table indicates the third transformed data that is a result obtained by multiplying third plain text data, which has been obtained by decrypting the third data, by a fourth constant, the fifth table indicates the fourth transformed data that is a result obtained by multiplying a reciprocal of fourth plain text data, which has been obtained by decrypting the fourth data, by a fifth constant that is different from the fourth constant, the sixth table indicates the output result that is a result obtained by dividing the remainder by the fourth constant and the fifth constant.

8. The information processing apparatus according to claim 5, wherein the output result is equivalent to a result obtained by multiplying third plain text data by fourth plain text data, or equivalent to a result obtained by dividing the third plain text data by the fourth plain text data, the third plain text data and the fourth plain text data being the encrypted text data items before encryption, the fourth table and the sixth table are commonly used, and the first memory unit stores a plurality of the fifth tables, the fifth tables being different from each other.

9. A non-transitory computer recording medium storing a program for causing a computer that processes a plurality of encrypted text data items, to perform an information processing method, the method comprising:

inputting first data and second data that are the encrypted text data items extracted from the plurality of encrypted text data items;

storing a first table used for transforming the first data and a second table used for transforming the second data respectively;

transforming the first data to first transformed data based on the first table;

transforming the second data to second transformed data based on the second table;

calculating an addition result by adding the first transformed data and the second transformed data;

obtaining a remainder by dividing the addition result by an exponential number having a value of two as a base and having a number of bits of the encrypted text data items as an exponent, wherein each of the encrypted text data items has a same number of bits;

storing a third table used for transforming the obtained remainder; and outputting an output result by transforming the obtained remainder based on the third table.

10. An information processing system comprising:

an information processing apparatus for processing a plurality of encrypted text data items; and an output terminal connected to the information processing apparatus, wherein the information processing apparatus includes an input unit configured to input first data and second data that are the encrypted text data items extracted from the plurality of encrypted text data items;

a first memory unit configured to store a first table used for transforming the first data and a second table used for transforming the second data respectively;

a first transforming unit configured to transform the first data to first transformed data based on the first table;

a second transforming unit configured to transform the second data to second transformed data based on the second table;

an addition unit configured to calculate an addition result by adding the first transformed data and the second transformed data;

a remainder calculation unit configured to obtain a remainder by dividing the addition result by an exponential number a value of two as a base and having a number of bits of the encrypted text data items as an exponent, wherein each of the encrypted text data items has a same number of bits;

a second memory unit configured to store a third table used for transforming the obtained remainder; and a third transforming unit configured to output an output result by transforming the obtained remainder.

* * * * *